(12) United States Patent
White

(10) Patent No.: US 8,093,497 B2
(45) Date of Patent: Jan. 10, 2012

(54) SELF RETAINED ELECTRICAL DEVICE HAVING POSITIVE LOCKING MECHANISM

(75) Inventor: Patrick M. White, West Chester, PA (US)

(73) Assignee: Socket-Lockits, Inc., West Chester, PA (US)

(*) Notice: Subject to any disclaimer, the term of this patent is extended or adjusted under 35 U.S.C. 154(b) by 237 days.

(21) Appl. No.: 12/633,887

(22) Filed: Dec. 9, 2009

(65) Prior Publication Data

US 2010/0120276 A1 May 13, 2010

Related U.S. Application Data

(63) Continuation-in-part of application No. 12/140,315, filed on Jun. 17, 2008, now Pat. No. 7,652,210.

(60) Provisional application No. 60/937,959, filed on Jul. 2, 2007, provisional application No. 61/273,057, filed on Jul. 30, 2009.

(51) Int. Cl.
*H02G 3/14* (2006.01)

(52) U.S. Cl. .............. 174/67; 174/66; 439/137; 33/528

(58) Field of Classification Search .............. 174/66, 174/67; 220/241, 242; 439/135, 136, 106, 439/149, 373; 33/528
See application file for complete search history.

(56) References Cited

U.S. PATENT DOCUMENTS

| | | | |
|---|---|---|---|
| 2,058,292 A | 10/1936 | Benander | |
| 3,989,334 A | 11/1976 | Fortino | |
| 4,302,624 A | 11/1981 | Newman | |
| 4,426,121 A | 1/1984 | Stoewe et al. | |
| 4,435,032 A | 3/1984 | Abramson | |
| 4,662,697 A * | 5/1987 | Moses | 439/148 |
| 4,968,856 A * | 11/1990 | Bowley et al. | 174/67 |
| 5,024,603 A | 6/1991 | Hsieh | |
| 5,082,450 A | 1/1992 | Warren, Sr. et al. | |
| 5,087,796 A * | 2/1992 | Norman | 174/67 |
| 5,320,542 A | 6/1994 | Cheng | |
| 5,480,318 A | 1/1996 | Garrison | |
| 5,691,507 A | 11/1997 | Wei | |
| 5,928,023 A * | 7/1999 | Buckner et al. | 439/373 |
| 5,947,755 A | 9/1999 | Conway | |
| 6,674,003 B1 | 1/2004 | Torres | |
| 6,699,050 B1 | 3/2004 | Wong et al. | |
| 6,703,562 B1 | 3/2004 | Pacheco | |
| 6,794,575 B1 | 9/2004 | McBain et al. | |
| 7,005,580 B1 | 2/2006 | Craig | |
| 7,045,708 B2 | 5/2006 | Miura et al. | |
| 7,070,426 B2 | 7/2006 | DeCell, Jr. et al. | |

* cited by examiner

*Primary Examiner* — Dhirubhai R Patel
(74) *Attorney, Agent, or Firm* — Dennis M. Carleton; Fox Rothschild LLP

(57) ABSTRACT

A self retained cover assembly for holding an electrical device in an electrical outlet. The cover includes a retaining body with a front face for covering the outlet and a rear face with two retainer prongs having moveable barbs for holding the cover to the outlet. The cover retains an electrical cord or an electronic device with electrically conductive prongs to the outlet. A tab is provided to move the barbs so the cover may be removed from the outlet.

20 Claims, 23 Drawing Sheets

SELF RETAINED ELECTRICAL DEVICE HAVING POSITIVE LOCKING MECHANISM

RELATED APPLICATIONS

This application is a Continuation in Part of and claims benefit from U.S. application Ser. No. 12/140,315, filed Jun. 17, 2008, entitled "Protective Electrical Outlet Cover Having Integrated Positive Locking Mechanism". This application also claims benefit from U.S. Provisional Application Ser. No. 61/273,057, filed Jul. 30, 2009, entitled "Electrical Outlet Plug Retainer Having Integrated Positive Locking Mechanism"

BACKGROUND OF THE INVENTION

It is generally well known in the art to cover electrical outlets with protective outlet covers to prevent unwanted tampering, especially by babies and young children, and, for outdoor outlets, for purposes of weatherproofing the outlet.

The outdoor cover designs include box shaped structures surrounding the outlet or cover plate implementations, which are offered with a variety of miniature spring-loaded doors covering the individual sockets. The miniature doors are provided so that they slide or pivot out of the way to accommodate an electrical cord to be plugged into the outlet.

The same concept of a cover plate has been extended into the interior of the home as a child safety device. Some of these designs also offer the ability to retain an electrical plug in the outlet. Installation of these devices, most often requires the removal of the existing outlet plate and its replacement with one having an integrated protective device. These types of covers tend to be expensive since they are manufactured as a series of assembled components and require removal and discard of the existing outlet plate.

For interior outlets there are also products that work with the individual sockets in an outlet. Many of these designs consist of a cover and some type of prongs for engaging and holding the plug into the outlet. These prongs are typically sized to work like the prongs on an electrical plug and engage the electrical contacts inside the outlet to hold the cover in place. These are very well known in the art and consist mainly of a plastic faceplate in the shape of an outlet, having two plastic prongs extending therefrom which are designed to engage the outlet in the two rectangular slots. None of these devices have the ability to retain an electrical plug in the outlet.

Although the use of these types of safety devices do not require the replacement of the existing outlet plate, they only rely on the application of force in one direction for removal. Further, these types of safety devices do not have a positive locking feature. Therefore, once a child understands how to pull on them, they tend to remove them out of curiosity, thereby attracting them to the very thing they are being guarded from. Because these types of cover plugs are easy to remove, and lack a positive locking feature, they have traditionally been manufactured in material and shapes that do not suggest to children that they are objects of attention.

Other designs have improved on this idea and have provided more complicated devices. One such design is shown in U.S. Pat. No. 6,699,050 to Wong, et al., in which a barbed, spring-loaded prong engages the ground hole of the outlet. The prong and the sliding mechanism are encased in a protective plastic housing that covers the remaining slots in the outlet when the device is in place. Another design is shown in U.S. Pat. No. 5,024,603, which discloses a device having barbed prongs and a locking mechanism. Both of these designs, however, suffer from the disadvantage of being relatively complicated and comprise multiple parts, requiring assembly, making them relatively expensive to manufacture.

Therefore there is a need to have an outlet protection device, an electrical plug retainer, and an electrical device retainer that does not require the removal of an existing outlet plate due to the expensive nature of the cost of removal and replacement.

There is also a further need for an outlet protection device, an electrical plug retainer and an electrical device retainer that can be manufactured as a single component or as a small assembly to reduce the cost of manufacture.

In addition, it is desirable to have an outlet protection device, an electrical plug retainer, and an electrical device retainer that requires force to be applied simultaneously in two different directions to increase the complexity of removal of the device from the outlet. Similarly, it is desirable to have an outlet protection device and an electrical plug retainer that includes a positive safety lock not allowing the device to be removed without some type of activation force.

There is still yet a need for protecting access to the electrical prongs of an electrical device in an outlet to avoid human contact with the prongs by retaining the prongs in the outlet or containing them at the outlet.

Lastly, it is desirable to have an outlet protection device, an electrical plug retainer and an electrical device retainer which can be manufactured with colors or designs, which are attractive and decorative while still maintaining their safe utility.

SUMMARY OF THE INVENTION

The present invention is directed to an outlet protection device with a cover for protecting an electrical socket that is inexpensive to manufacture, easy to use, and which provides a positive locking mechanism, requiring force to be applied simultaneously in at least two directions for removal.

In one embodiment of the invention, the cover has at least one prong for engaging the opening of the electrical socket and a reverse tongue defined within the prong having a barb disposed thereon for positively engaging the rear surface of either rectangular opening of the socket. Unlike other safety covers, the flexible tongue defined in the prong carrying the barb acts as a catch on the back of the socket opening. After engaging the socket, any attempt to remove the cover without displacing the barbed tongue is averted by the barb, which engages with more strength against the back of the socket as it is pulled from the outlet, thereby acting as a self-reinforced locking mechanism.

The device is contemplated to work with one or two rectangular prongs present. In embodiments with two rectangular prongs, the barbed tongue may be present on one or both of the prongs. In addition, a rounded prong for engaging the ground opening may be present on the device as well, although it is not contemplated that the rounded prong would act as part of the locking mechanism.

During insertion of the device, the prong will engage the contacts inside the socket similar to the prong on an electrical device. The barb, having a reverse, ramped shape, upon contacting the front of the socket opening, deflects in relationship to the prong due to compression of the spring mechanism, allowing the barb to pass though the rectangular opening of the outlet at the same time as the prong. Once the device is fully inserted into the electrical outlet, the spring mechanism is allowed to rebound, causing the straight edge of the barb to engage the rear surface of the socket.

To release the barb and remove the device from the outlet, the spring mechanism must be compressed such that the barb no longer contacts the rear surface of the socket. In some embodiments, the spring mechanism has a release tab extending through the cover of the device such that the tab can be depressed from the outside of the cover, thereby releasing the barb. Alternatively, the cover may require the insertion of an object in an opening defined in the cover to release the barbed tongue. Other means of releasing the barb are also contemplated.

Removal of the cover requires the tongue to be deflected at the same time a pulling force is exerted on the cover. This dual activation makes it significantly more complicated for children to figure out the release process, making it more likely that the devices will not be removed the children.

In an alternate, and likely preferred embodiment of the invention, the prong itself is a "U"-shaped structure having a barb defined on one leg of the "U" and a tab defined on the end of the leg of the "U" on which the barb is defined. The tab extends from the back of the cover and allows the deflection of the leg of the "U" carrying the barb for removal of the device.

Normally, such devices would be colored as blandly as possible to blend in with the socket, to avoid attracting the attention of children to the device. However, due to the fact that there is a positive lock mechanism on the device of the present invention, the covers may also be decorative. In the preferred embodiment of the invention the device may be provided with a decorative cover. The cover can be in the shape of all kinds of decorative objects, such as animals, race cars, stars and sea creatures. The shapes can be two-dimensional silhouettes or three-dimensional and can be printed or colored to display pictures or printed or colored images.

In yet another preferred embodiment an electrical outlet plug retainer for protecting an electrical device in an outlet is shown. This retainer is useful for keeping electrical devices plugged into the wall or to avoid having children accessing the electrical prongs on the device should it inadvertently be pulled from the outlet. The retainer has a body with a protective face to cover both sockets of an electrical outlet and a cavity for containing a plug of an electrical device. The body has a rear face with at least one prong rigidly attached and extending from the rear face, where the prong is a spring mechanism carrying a barb biased by the spring to engage the electrical socket when the plug retainer is inserted.

In still yet another embodiment an electrical plug retainer is provided for protecting an electrical cord in an outlet. The retainer has a body with a protective face for covering two sockets in an electrical outlet and a rear face which includes a cavity for retaining the plug and an opening through the protective face for the cord. The body includes at least one "U" shaped spring prong extending from the rear face of the body with one leg of the "U" rigidly attached to the body and the other leg moveable with respect to the other leg. The moveable leg has a barb with one ramped side for engaging the socket opening during insertion. As the retainer is inserted into the socket the mobile leg is deflected so that the barb fits through the rectangular opening in the socket. The barb being biased by the spring to engage the socket holding the electrical plug retainer and the electrical cord in place.

In yet another embodiment a self retained electrical device is shown. The retainer having a body with a protective face for covering a pair of sockets in an electrical outlet. The body has a rear face which includes non-conductive prongs for engaging one of the sockets. The body also includes two insulated retainer prongs rigidly attached to and extending from the rear face of the retaining body, wherein the insulated prongs are generally "U" shaped spring mechanisms with one leg of the "U" rigidly attached to the body, and the other leg being moveable with respect to the rigidly fixed leg. The moveable legs have barbs with one ramped side for engaging the other socket as the electrical device is inserted. During insertion, the mobile legs are deflected such that the barb fits through a rectangular slit in the outlet, being biased by the spring to engage the back of the electrical socket when the electrical device is inserted. A tab rigidly connects to the two moveable legs together in such a manner so that the tab extends outwardly from the body so that a force may be applied to the tab to cause the moveable legs to move towards the rigidly fixed legs causing the barbs to disengage from the rear surface of the outlet so the device may be removed from the outlet.

In still yet another embodiment a self retained cover assembly is shown for holding an electrical device in an outlet. The retainer body has a front cover face and a rear face. The assembly includes two electrically conductive prongs for engaging one of the sockets and a pair of retainer prongs extending from the rear face. The retainer prongs have a moveable barb biased to engage the opening when the cover is inserted therein.

In a final embodiment a self retained cover assembly for holding an electrical device in an outlet is shown. The assembly includes a retaining cover having a rear face and a protective front face for covering a socket in an electrical outlet. Two retainer prongs extend from the rear face of the cover and each retainer prong is generally "U" shaped having one leg of said "U" shape rigidly attached to the rear face of the said retaining cover, and the other leg having a barb moveable with respect to the rigidly fixed leg. The barb has one ramped side to engage the outer surface of the second socket as the assembly is inserted into the outlet, which deflects the moveable arm such that the barb fits through the rectangular openings in the said first socket of the outlet. A tab connects the moveable arms of the retainer prongs to move the barbs to disengage them from said electrical outlet, enabling the removal of the cover from the outlet. The assembly also includes a housing member adapted to receive the retaining cover and hold it in place. The housing member has a rear face with two electrically conductive prongs extending from the rear face to conductively engaging a second socket in the outlet.

The above and other features of the invention including various novel details of construction and combinations of parts, and other advantages, are more particularly described below with reference to the accompanying drawings. The drawings are not necessarily to scale, the emphasis instead being placed upon illustrating the principles of the invention.

DETAILED DESCRIPTION

Figure 1:
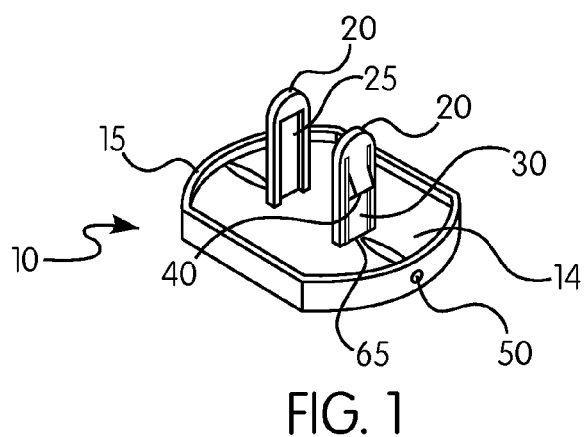
FIG. 1 is a perspective view of a first embodiment of the invention, showing an electrical outlet protection device having two prongs with barbed tongues.
Figure 2:
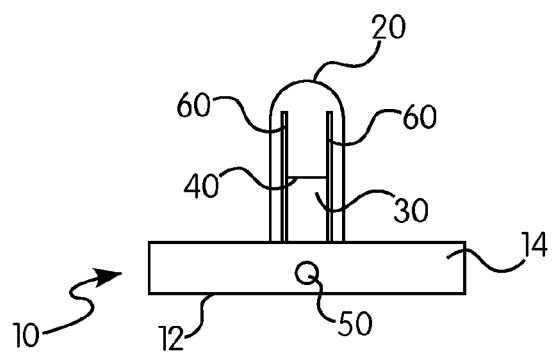
FIG. 2 is a side view of the device of FIG. 1.
Figure 3:
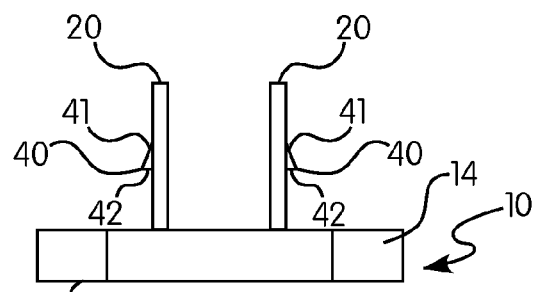
FIG. 3 is a front view of the device of FIG. 1.
Figure 4:
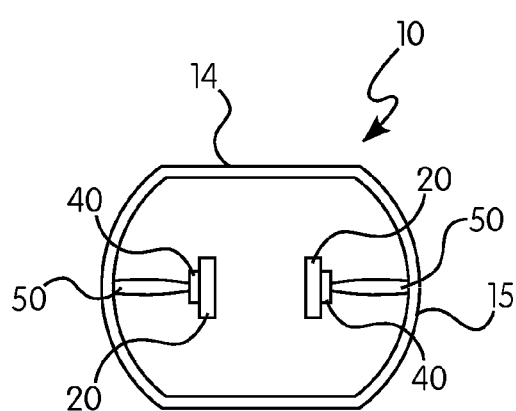
FIG. 4 is a top view of the device of FIG. 1.

The devices of the present invention are meant to be used with standard electrical outlets or sockets which are well known in the art and which are commonly found in residences and businesses. The use of the term "outlet" herein is meant to include all well-known design variations on electrical sockets commonly in use in the United States. It is also contemplated that the devices could be used in foreign countries merely by altering the shape of the prongs of the device, without deviating from the spirit of the invention FIGS. 1-4 show a first embodiment of the protective cover 10 of the present invention. Protective cover 10 has main body 14 defining rim 15 around the rear perimeter thereof. Main body 14 has two prongs 20 extending from the rear surface thereof, each of prongs 20 defining a reverse tongue 30 with barbs 40. Reverse tongues 30 are relieved from prongs 20 on either side with slits 60 and on the lower end thereof with slit 65. Tongue 30 is also relieved on the inside surface 25, having a thinner cross sectional area than the remainder of prong 20, to allow barbs 40 to deflect within the width of prong 20 while being inserted into an electrical outlet.

Ramped surfaces 41 on one side of barbs 40 cause the deflection of tongue 30 during insertion of the device, and allows barbs 40 to fit within the width of the rectangular openings on the outlet. When prongs 20 have been fully inserted into a typical electrical outlet, tongues 40 will rebound to their original position, allowing the flat surface 42 defined on the opposite side of barb 40 to catch on the rear surface of the outlet, thereby holding the device in place within the outlet until released.

Removal of protective cover 10 requires that tongues 30 be deflected inward, such that barbs 40 disengage from the rear surface of the outlet. To release barbs 40, tongues 30 may be accessed through rim 15 using access holes 50 defined in rim 15. Cover 10 could be configured such that external object is required to be inserted into holes 50 for removal of the device.

Figure 5:
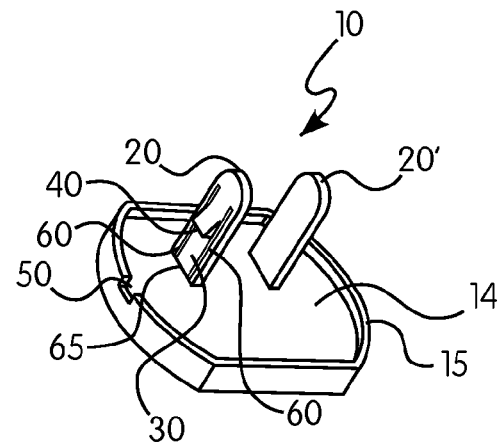
FIG. 5 is a left perspective view of a second embodiment of the invention, showing a version of the device having only one prong with a barbed tongue.

Variations of the first embodiment of the invention include protective covers having two prongs 20 and 20', wherein only one prong 20 is configured with tongue 30 and barb 40, while the other of prongs 20' is solid. This configuration is shown in FIG. 5. Other variations, not explicitly shown in the drawings, but nonetheless contemplated to be within the scope of the invention include covers having only one prong, covers having a prong shaped to fit within the ground hole of the outlet, and any combination of prongs and tongued prongs. An additional variation will have one smaller prong and one larger prong to accommodate polarized outlets having two different sized rectangular openings.

Figure 6:
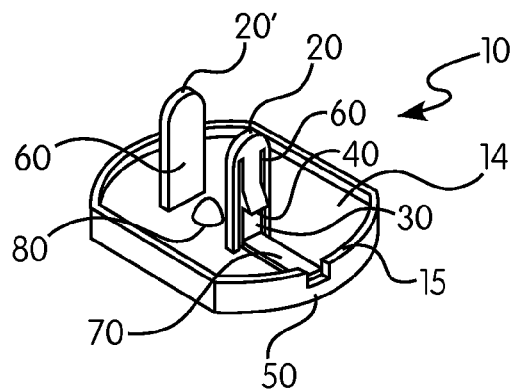
FIG. 6 is a right perspective view of a third embodiment of the invention, showing an electrical outlet cover of FIG. 5 having a release mechanism.
Figure 7:
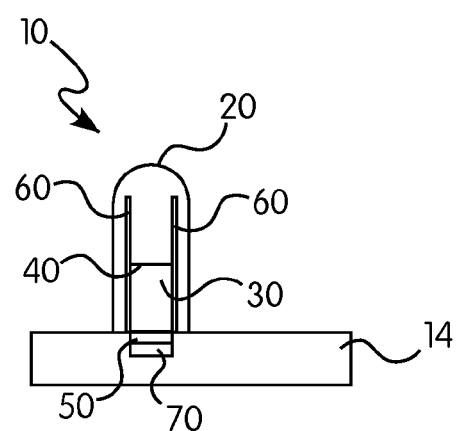
FIG. 7 is a side view of the device of FIG. 6.
Figure 8:
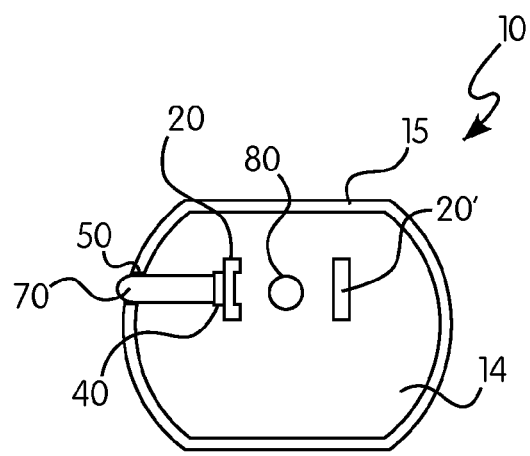
FIG. 8 is a top view of the device of FIG. 6.

FIGS. 6-8 show a second embodiment of the invention. In many aspects, this embodiment is essentially identical to the embodiment shown in FIG. 1. The main difference is the presence of tab 70 that protrudes through or is accessible through opening 50 defined in rim 15. Tab 70 may be pressed from the outside of protective cover 10 to disengage barb 40 from the rear surface of the outlet. Tab 70 may protrude slightly through rim 15, or may be slightly recessed within the rim. Note that, for tab 70 to work properly, tab 70 must be able to slide freely back and forth, and must therefore remain offset from the outlet. Post 80, located between prongs 20 and 20' serves to keep the body of device 10 from pressing tab 70 into the surface of the outlet.

As with the embodiments shown in FIGS. 1-5, all variations as discussed above with respect to the embodiment of FIGS. 1-5 are contemplated to be applicable to this embodiment as well.

Figure 9:
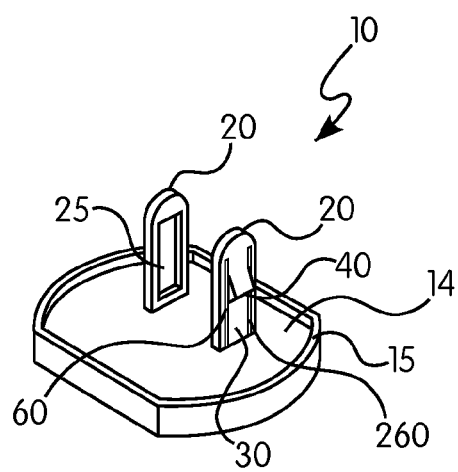
FIG. 9 is a perspective view of a fourth embodiment of the invention, showing a version of the device with a bridged tongue having a two-sided barb.
Figure 10:
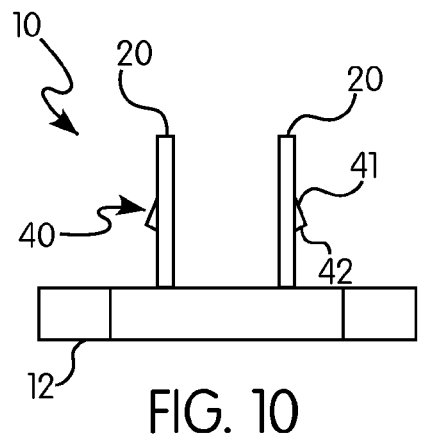
FIG. 10 is a side view of the embodiment of FIG. 9.

FIGS. 9-10 shows a third embodiment of the invention in which protective cover 10 is configured with barbs 40 having a slightly different shape than those of previous embodiments. In this embodiment, rim 15 has no openings, as tongues 40 need not be deflected using external means to effect removal of the device. Instead, in this embodiment, barbs 40 have two ramped surfaces 41 and 42, and tongues 30 are only relieved from prongs 20 on their sides by slots 60. Additional slot 65 is not present on the bottom of tongues 30, as with other embodiments. To remove protective cover 10 having this design, additional pulling force is required, as tongue 30 will be more difficult to deflect. Ramped edge 42 defined on barb 40 will deflect tongue 30 inwardly until barb 40 is released from the rear surface of the outlet.

Variations on this embodiment (not shown) are similar to those for the embodiments shown in FIGS. 1-8, including having only one prong 20 having a tongue 30 define therein and one solid prong 20'. In addition, a prong shaped to engage the ground hole of the outlet may also be provided.

Figure 11:
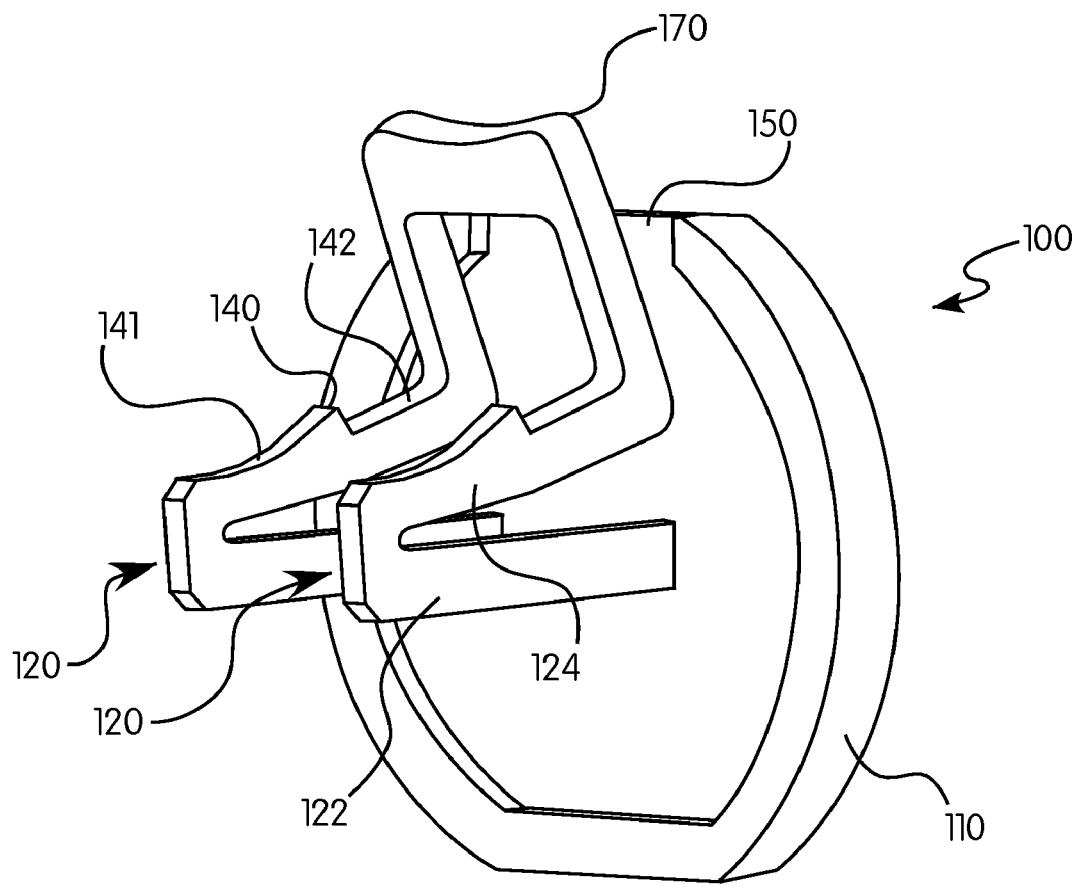
FIG. 11 is a perspective view of a fifth, and preferred embodiment of the electrical outlet protection device having an integrated spring clip mechanism.
Figure 12:
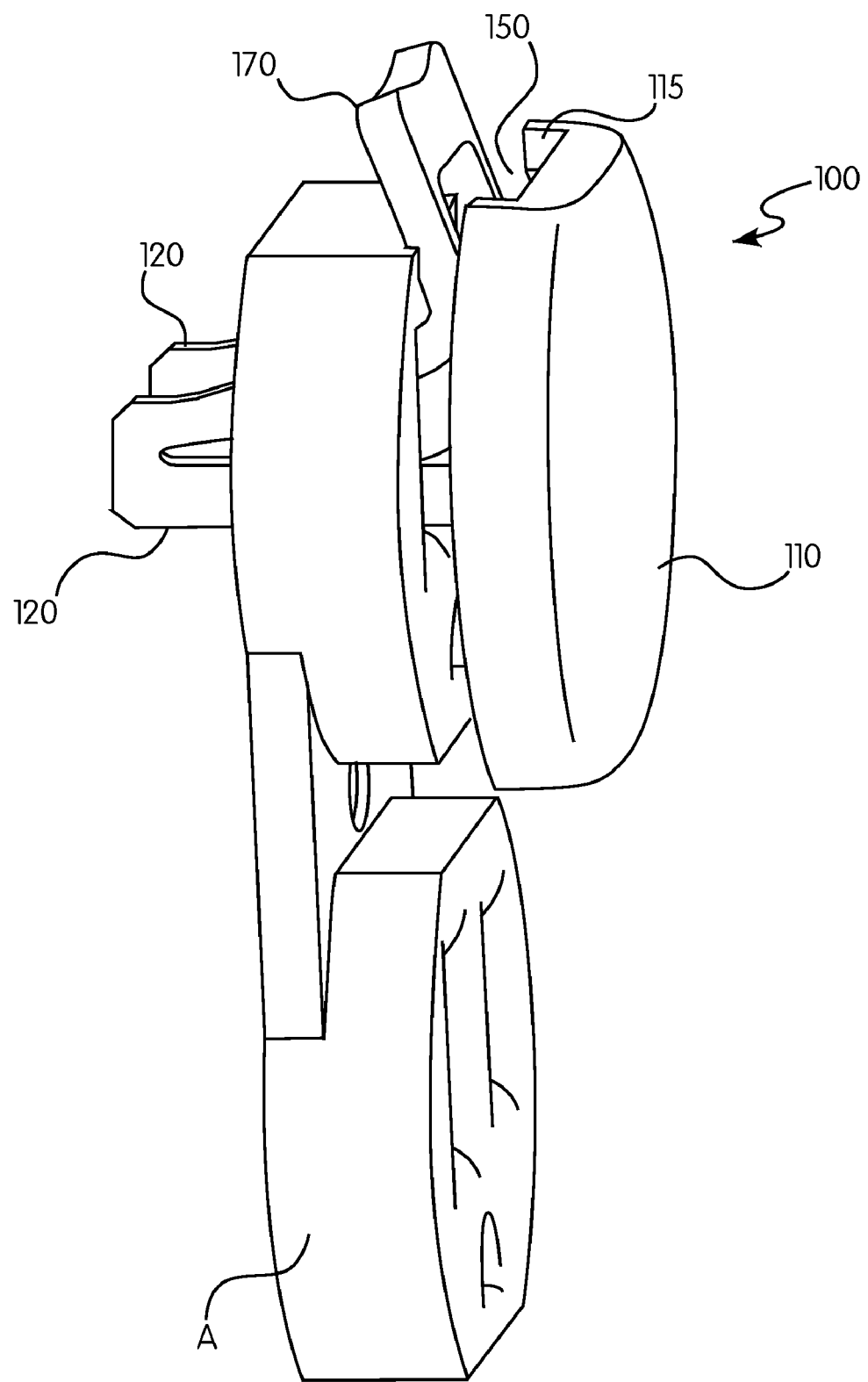
FIG. 12. is an in situ view of the device of FIG. 11 engaged in an electrical outlet.
Figure 13:
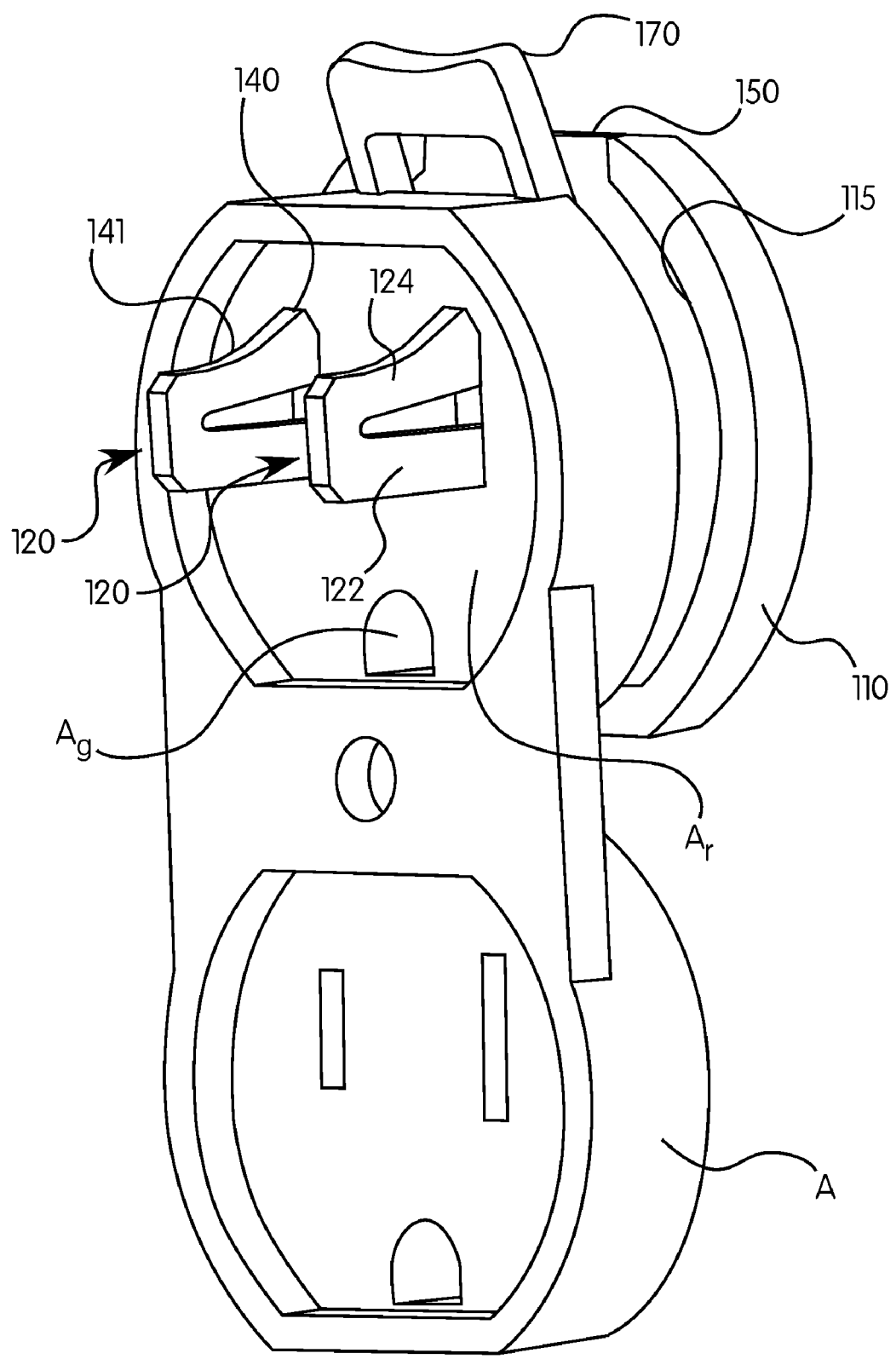
FIG. 13 is an in situ view of the device of FIG. 11 showing the rear of an electrical socket with the device engaged therein.

FIGS. 11-13 show a fourth and preferred embodiment of the invention. The device of this embodiment includes body 110 defining rim 115 on the rear perimeter thereof. Extending from body 110 are two structures 120, both being generally U-shaped and consisting of a first leg 122 and a second leg 124. Structure 120 is sized to fit into the rectangular openings of a typical electrical outlet and is rigidly connected to body 110 via first leg 122. Second leg 124 acts as a spring with respect to first leg 122. Second leg 124 defines a barb 140 thereon having a ramped surface 141 on one side and straight edge defining one side of recessed area 142 on the opposite side. Tab 170 connects ends of legs 124 and when pressed downwardly upon compresses the spring formed by legs 124 of structures 120, effecting release of the device from the electrical outlet.

FIGS. 12 and 13 shows protective device 100 in situ in an electrical outlet, labeled A in the drawing. Note that outlet A is not considered to be part of the invention but is shown in the drawings solely for the purpose of showing device 110 in operation.

FIG. 13 shows the rear of electrical outlet A having protective device 100 engaged therein. As can be seen, as protective device 100 is inserted into socket, a downward force is generated on leg 124 through the contact of ramp 141 with the top of the rectangular opening in outlet A. The force exerted on the ramp portion 141 of leg 124 of each of prongs 120 causes legs 124 to deflect downwardly allowing clearance for barbs 140 to enter the socket. Once barbs 140 clear the rear surface of electrical outlet A labeled $A_R$ in the drawing, legs 124 are relieved and spring upwardly, engaging barb 140 on the rear surface $A_R$ of outlet A. The body of outlet A rests within recess 142 when protective cover 110 is engaged therein.

Tab 170 is accessible from outside of outlet A and extends through slot 150 defined in rim 115 of protective device 100. To remove protective device 100 from the outlet A, tab 170 is pressed downward which causes legs 124 to deflect downward toward legs 122 until the tips of barbs 140 clear the tops of rectangular openings defined in outlet A and the device is able to be pulled out of outlet A.

As with other embodiments of the invention, the invention is meant to encompass various variations on this design including ones where one solid prong is provided and one prong is as shown in FIGS. 11-13. In such a case, tab 170 would not extend across both prongs 120 but instead would be connected singularly to the prong having a barb and spring defined thereon. In addition, a variation is contemplated having a third prong shaped to engage the ground hole $A_g$ of outlet A. In an additional variation, to accommodate the difference in the rectangular openings in a polarized outlet as shown in the bottom of outlet A in FIG. 13, structures 120, whether they be solid prongs or spring structures having barbs defined thereon may be of different sizes to accommodate the one larger and one smaller rectangular openings.

In another variation of this embodiment (not shown), it may be possible to utilize a barb having ramps on both sides thereof, as discussed with respect to the embodiment of the invention shown in FIGS. 9-10. In such a case, tab 170 may be eliminated, and the ends of legs 124 may also be rigidly attached to body 100. It may be necessary, in such cases that leg 124 be thinner in cross sectional area than leg 122, to provide a spring-like effect in leg 124 without movement of leg 122.

Figure 14:
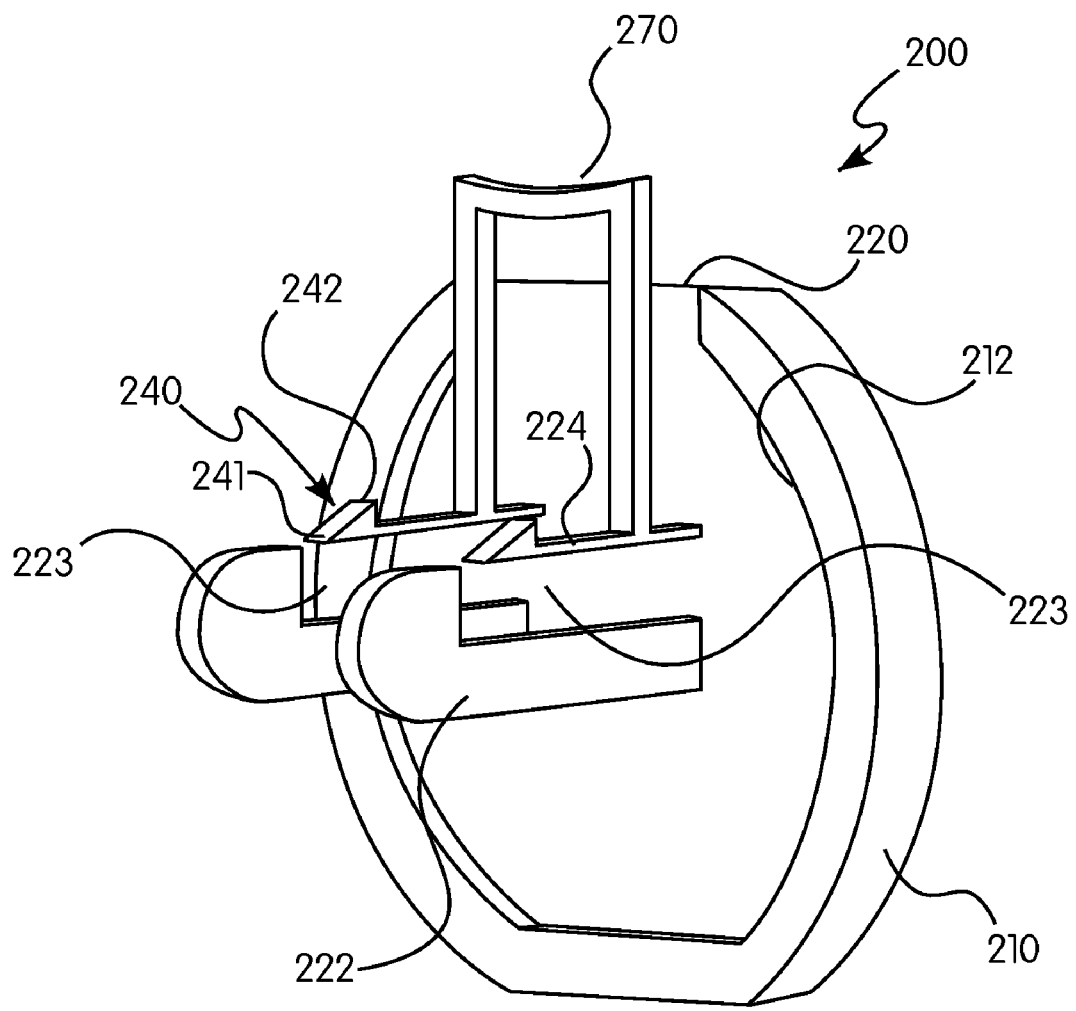
FIG. 14 is a perspective view of a sixth embodiment of the invention, showing an electrical outlet protection device having an integrated spring clip mechanism of a different design than that of the device of FIG. 11.
Figure 15:
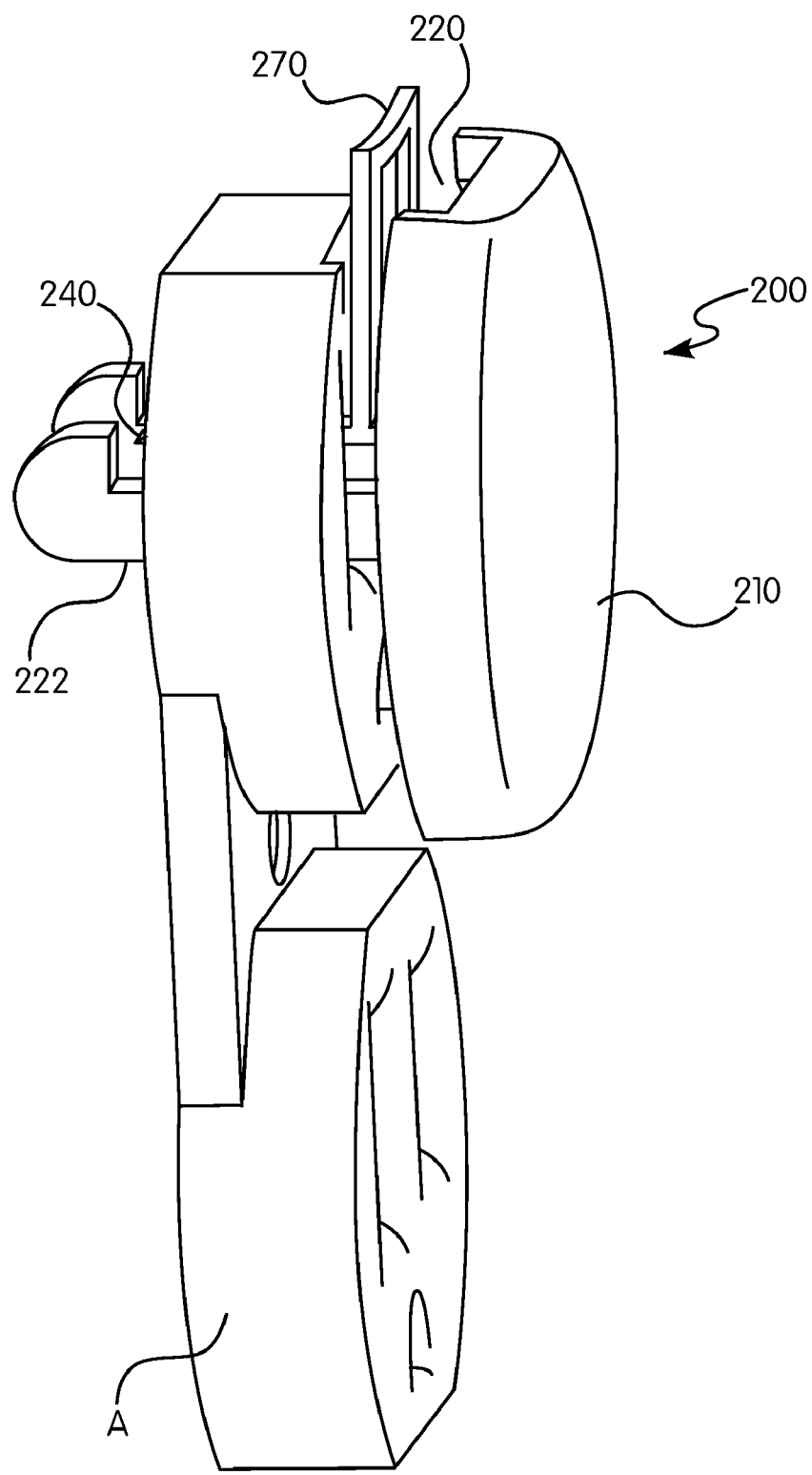
FIG. 15. is an in situ is a view of the device of FIG. 14 engaged in an electrical outlet.
Figure 16:
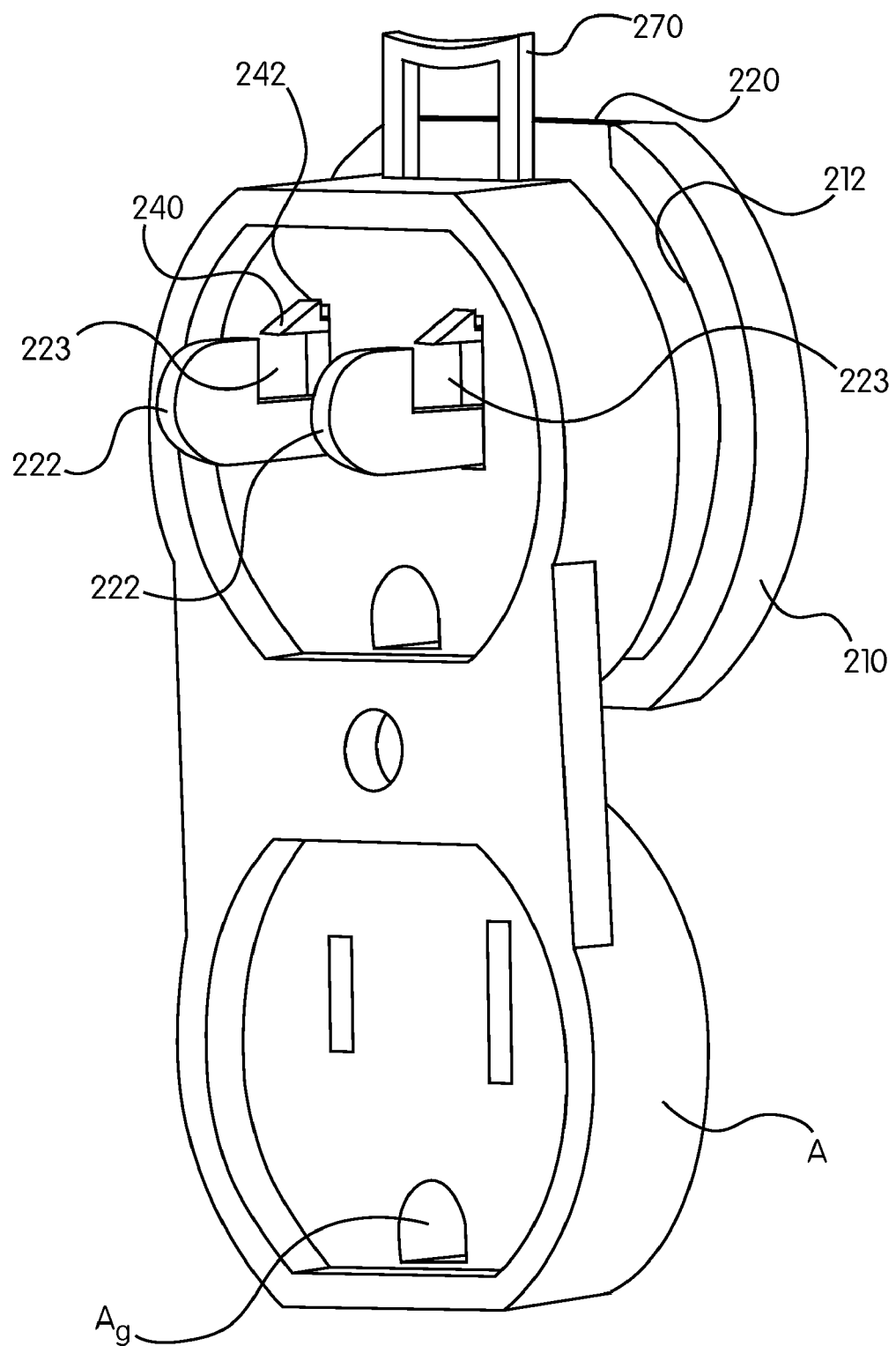
FIG. 16 is an in situ view of the device of FIG. 14 showing the rear of an electrical socket with the device engaged therein.
Figure 17:
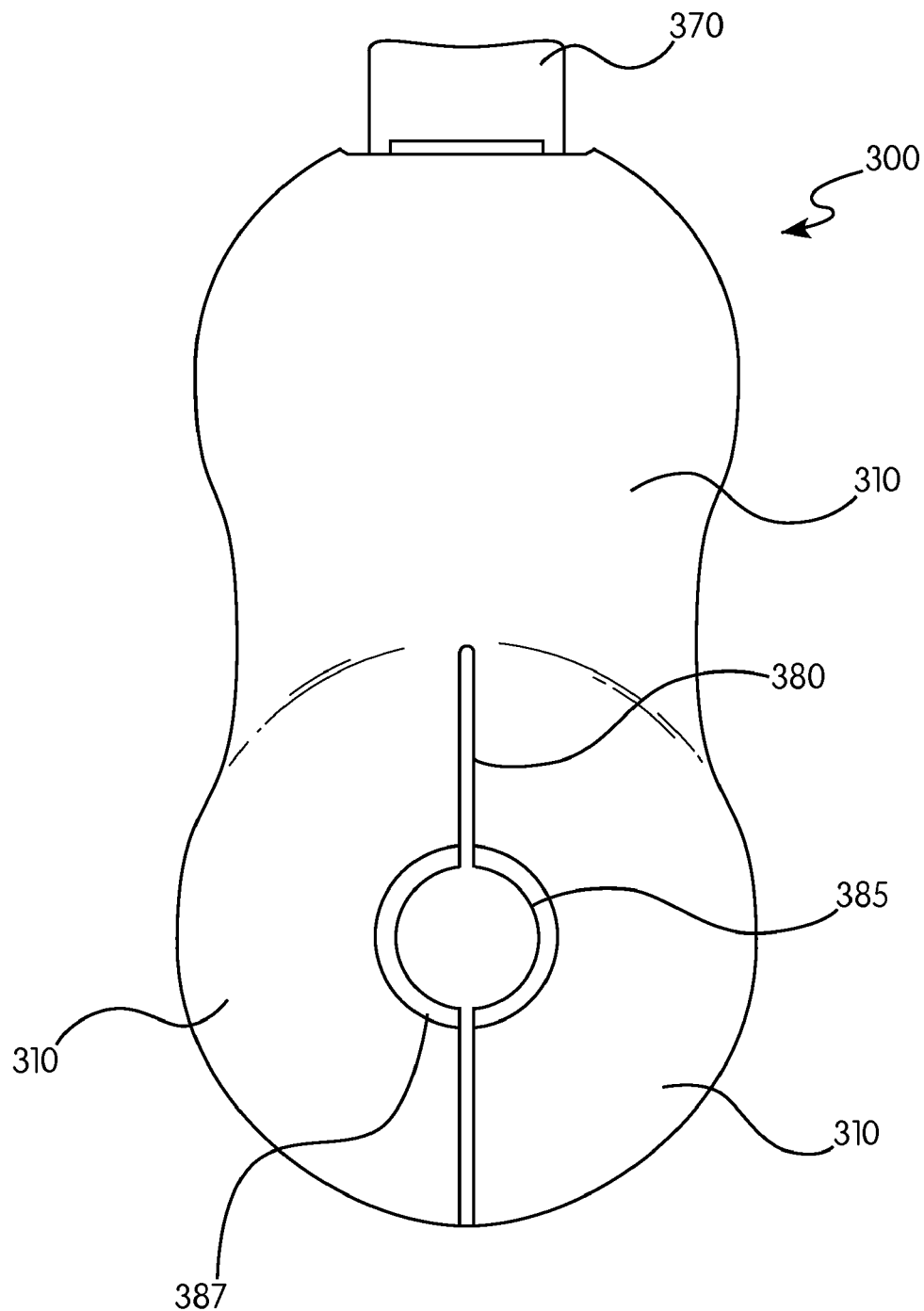
FIG. 17 is a front view of the electrical outlet plug retainer of the present invention.
Figure 18:
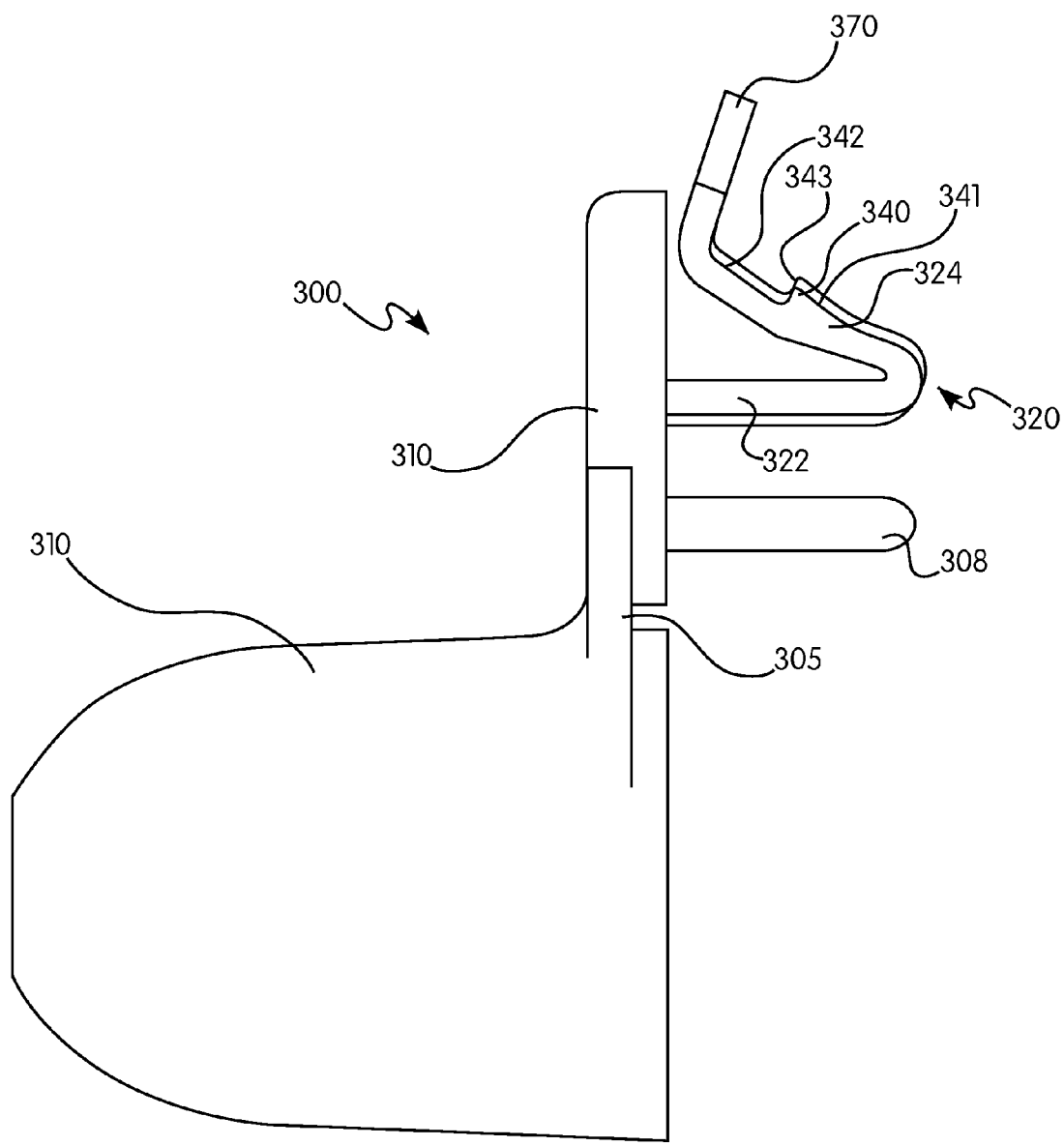
FIG. 18 is a side view of the electrical outlet plug retainer of the present invention.
Figure 19:
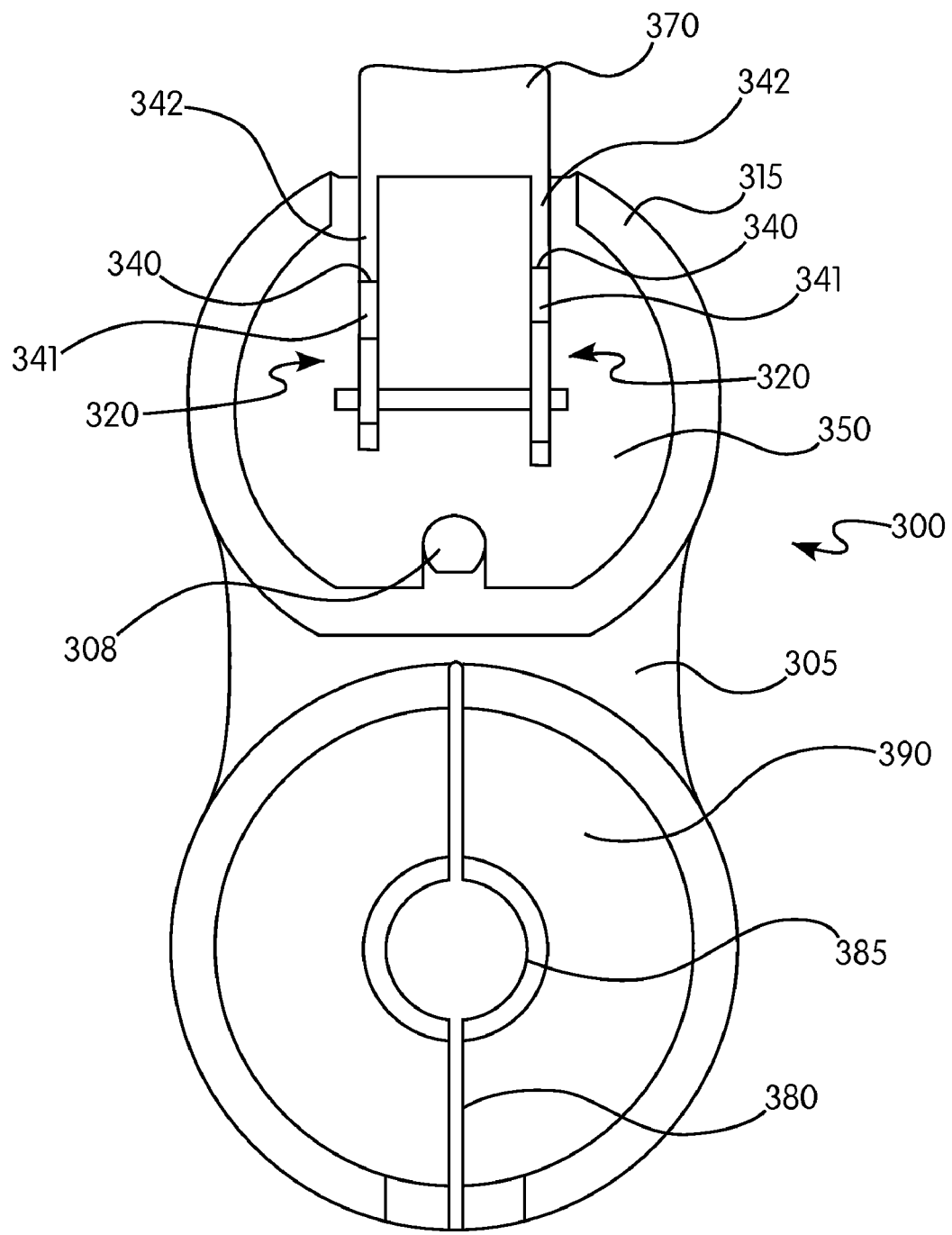
FIG. 19 is a rear view of the electrical outlet plug retainer of the present invention.
Figure 20:
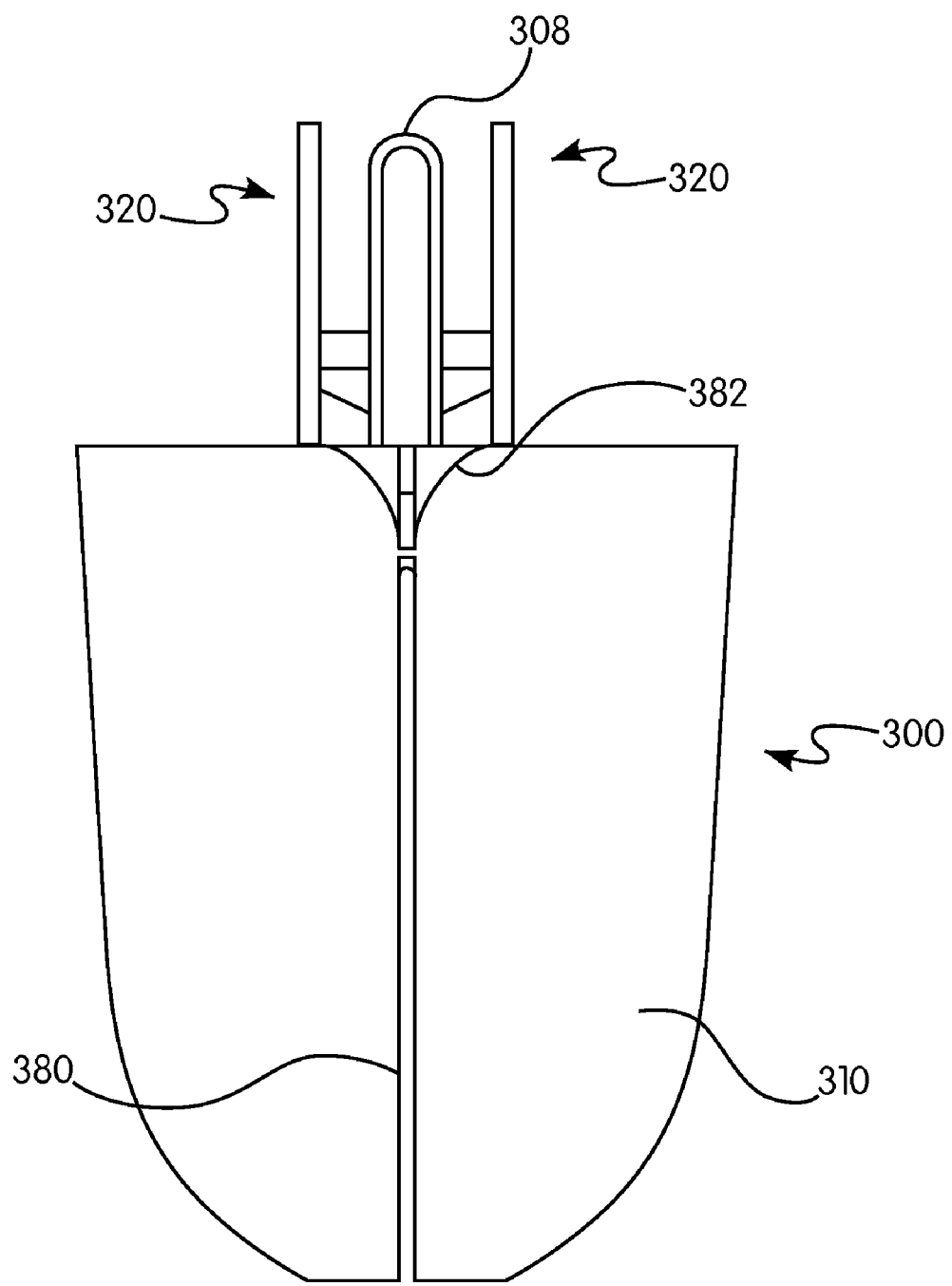
FIG. 20 is a bottom view of the electrical outlet plug retainer of the present invention.
Figure 21:
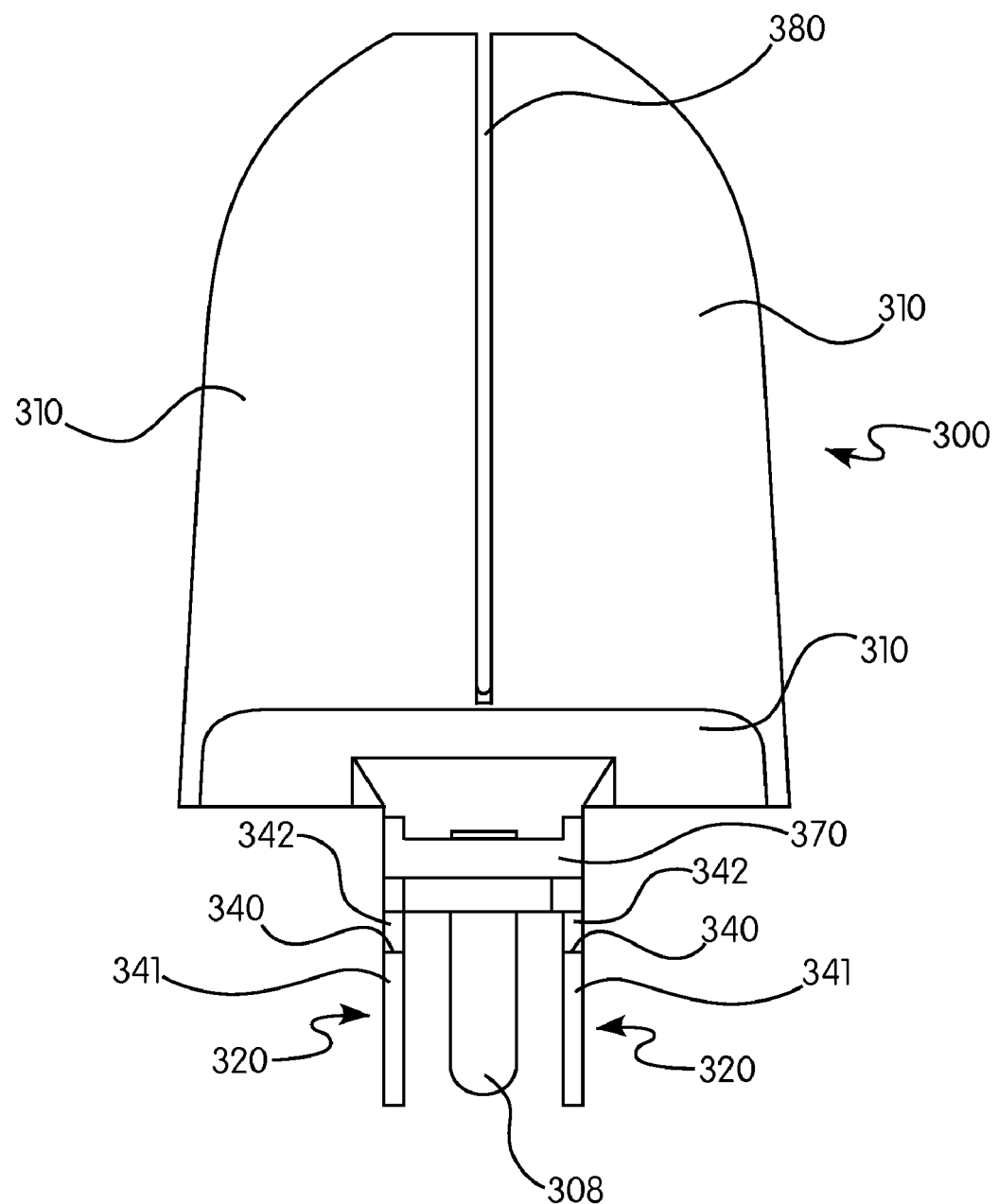
FIG. 21 is a top view of the electrical outlet plug retainer of the present invention.
Figure 22:
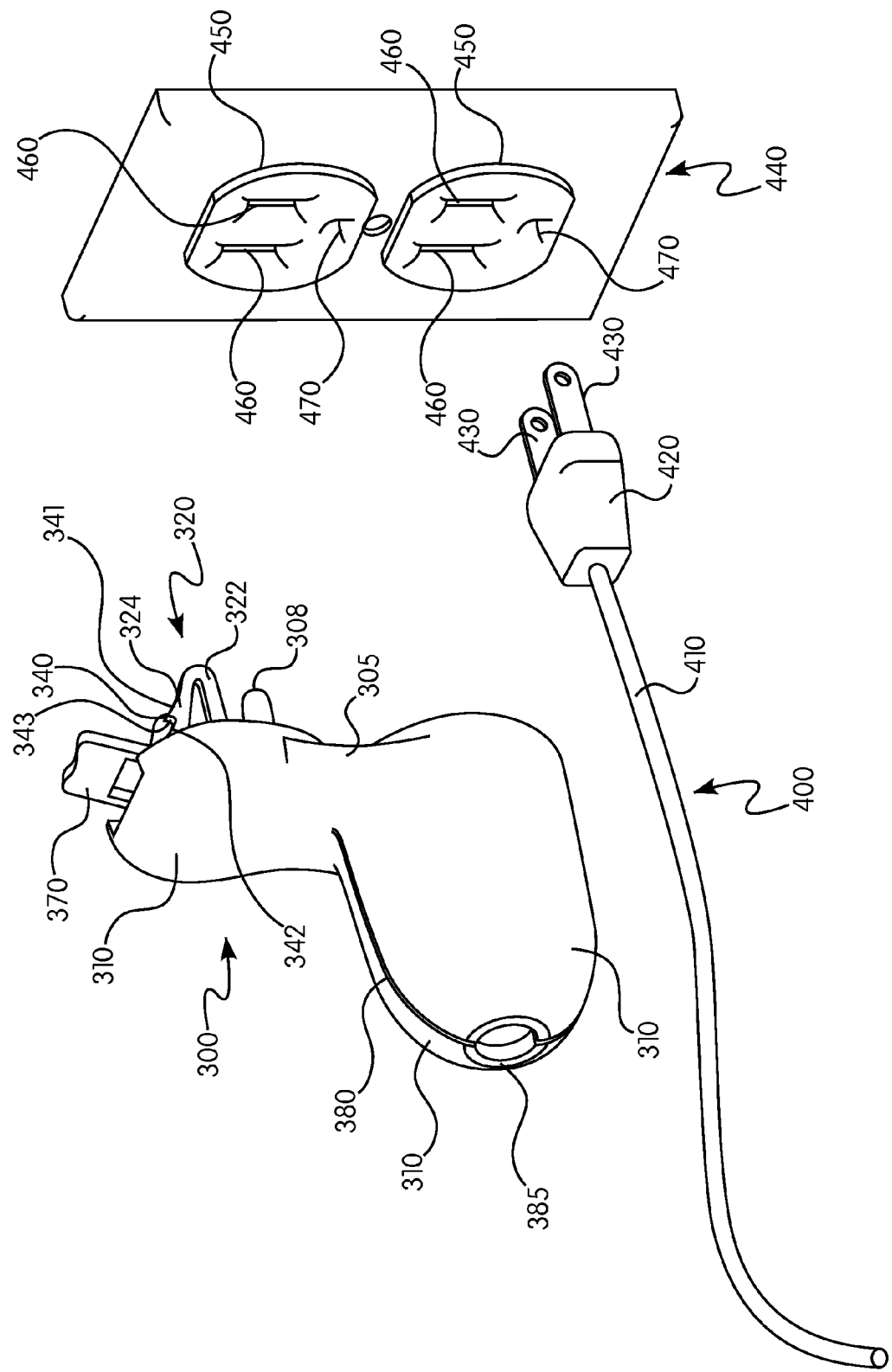
FIG. 22 is a perspective view of an electrical outlet, an electrical cord and the electrical outlet plug retainer of the present invention before assembly.
Figure 23:
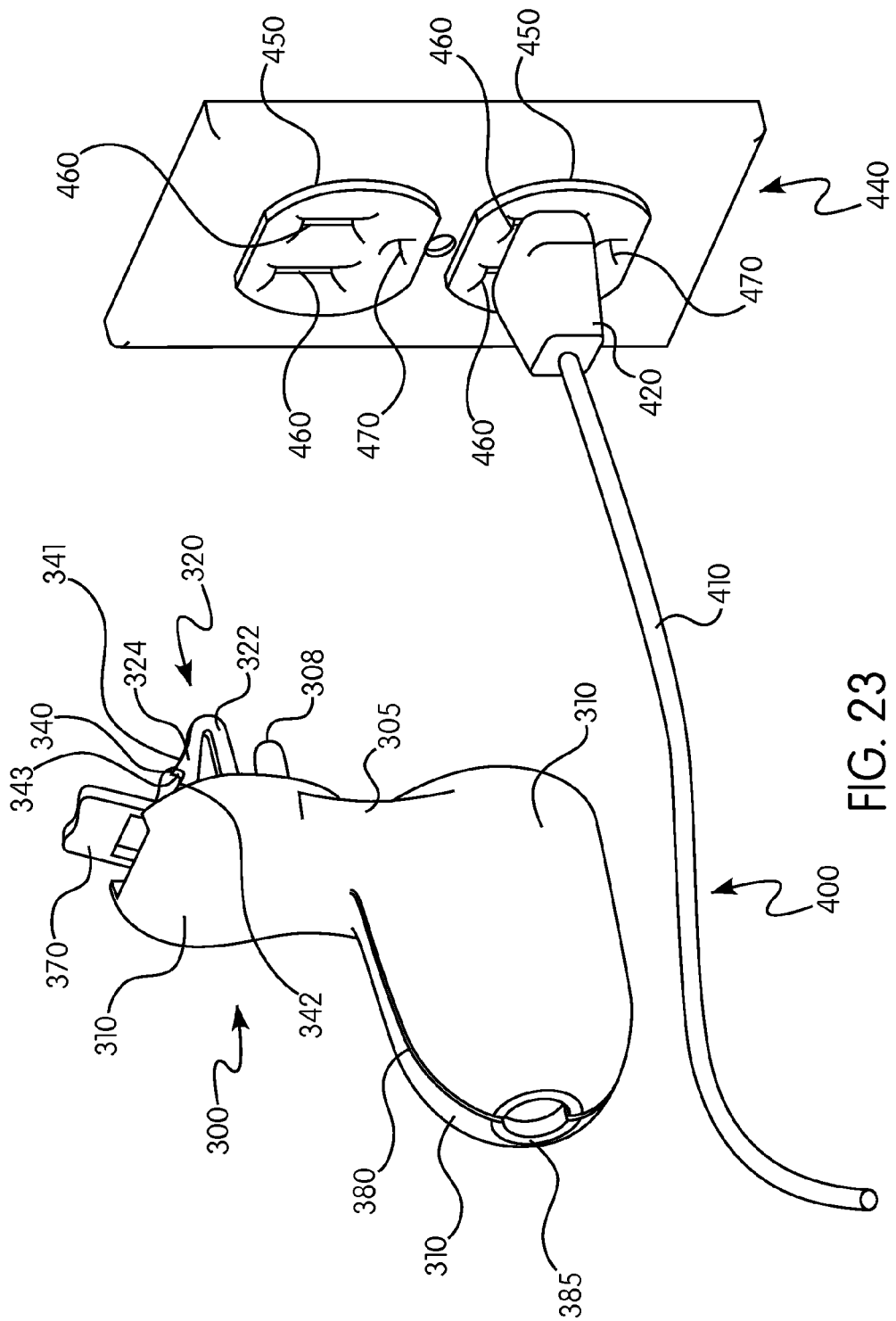
FIG. 23 is a perspective view of an electrical outlet with an electrical cord plugged in and an electrical outlet plug retainer of the present invention during assembly.
Figure 24:
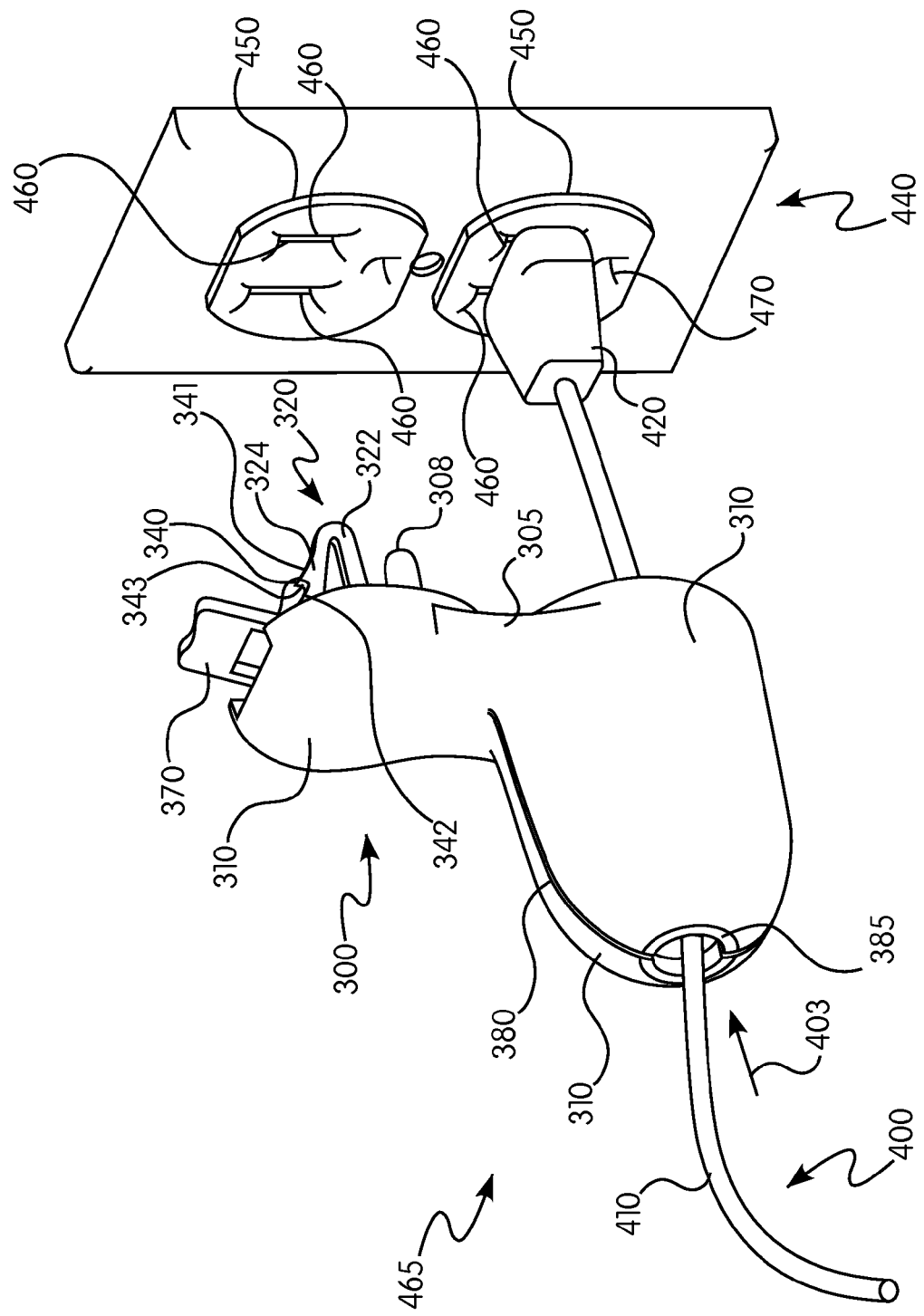
FIG. 24 is a perspective view of an electrical outlet with an electrical cord plugged in and an electrical outlet plug retainer of the present invention attached to the electrical cord.
Figure 25:
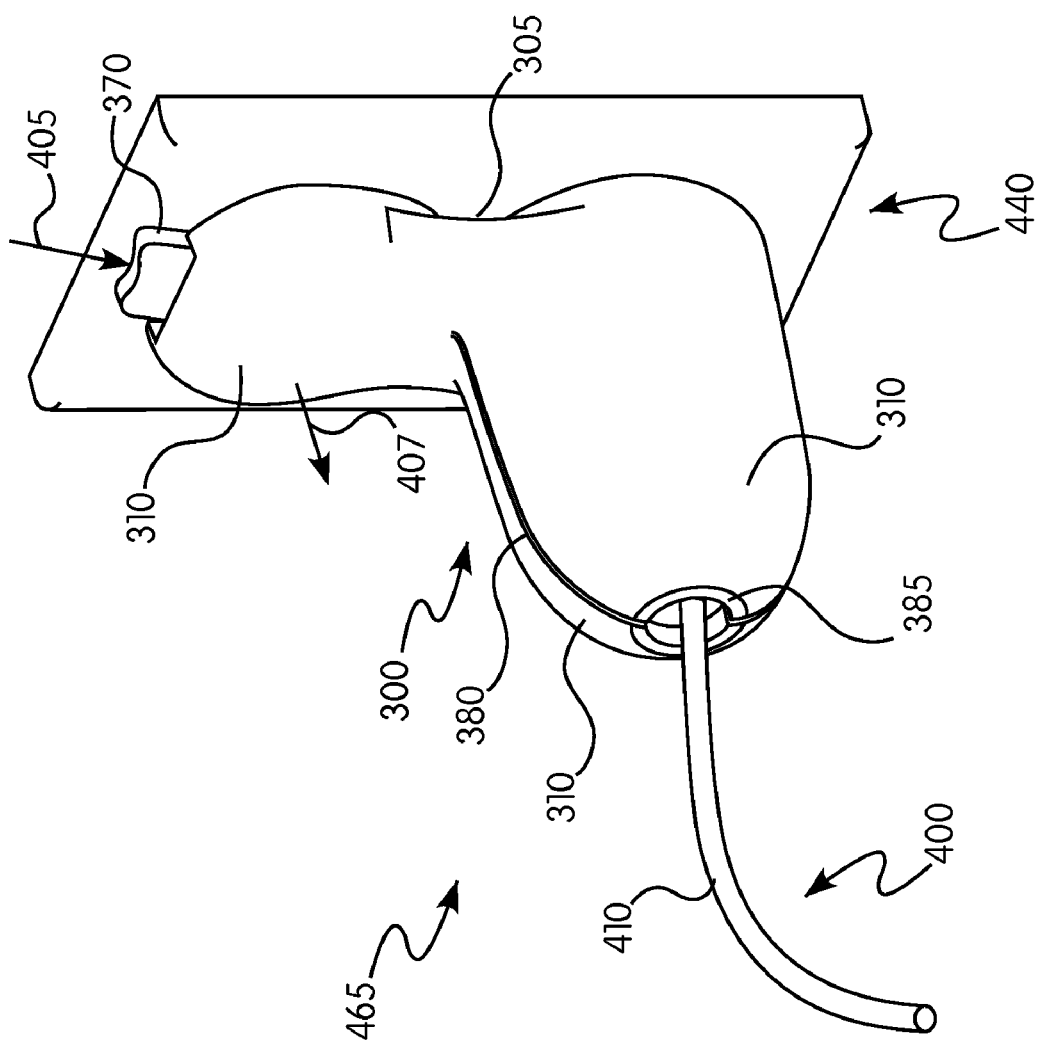
FIG. 25 is a perspective view showing the electrical plug retainer of the present invention plugged into the outlet retaining the electrical cord.

FIGS. 14, 15 and 16 show an addition embodiment of the invention. In this embodiment, similar to the embodiment in FIGS. 11-13, one or both rectangular prongs 222 are defined attached rigidly to body 210 of device 200, with the prongs defining recessed area 223. An additional, moveable spring 224 is provided having a barb 240 defined on the end thereof. Barb 240 has ramped edge 241 and straight edge 242 defining a recessed area behind barb 242. Connected to spring 224 is tab 270, accessible from outside of the outlet via opening 220. The recesses area 223 defined by prong 222 permits deflection of spring 224 into recess 223 during insertion and removal of the device from the outlet. All variations of the invention discussed with respect to other embodiments could be implemented with this embodiment as well. In addition, the device may be equipped with a prong (not shown) shaped to fit into the ground hole $A_g$ of the outlet. The ground prong may be solid or may be configured as discussed above with respect to rectangular prongs, having a recessed area 223 and an accompanying spring 224. In such a case, rectangular prongs 222 may be configured without spring 224.

As device 200 is inserted into the outlet, ramped end 241 of barb 240 deflects spring 224 into recess 223. Once barb 240 has cleared the rear surface of the outlet, spring 224 springs back into place and the wall of the outlet is contained within recess 242 by the straight edge of barb 240.

To remove the device, a force is applied to tab 270, deflecting spring 224 into recess 223, thereby releasing barb 240 from the rear surface of the outlet, at which time device 200 can be pulled from the outlet.

All devices discussed herein are contemplated to be made of an electrically non-conductive material such as plastic or polyethylene. The prongs defined on the rear of the bodies of the devices may be integrally molded with the body of the device or may be rigidly attached by various means including adhesive, screws or any other fastening means well known in the art. It is contemplated, however, that the prongs are rigidly connected to the rear of the body of the device and do not move with respect to the body of the device.

FIG. 17-26 show an alternative embodiment of the device having a cavity for capturing the head of an electrical cord of an external device. The device has an upper portion which defines an outlet plug retainer 300 which locks in to socket 450 of outlet 440 in the manor identical to any one of the outlet covers previously discussed and shown in FIGS. 1-16. The outlet plug retainer 300 has a cover face 310 located on the retainer body 305 which covers both sockets 450 in outlet 440. The cover face 310 has a slit 380 and hole 385 which are defined as an opening 387 for receiving an electrical cord 410 shown generally in FIGS. 22-25. To insert electrical cord 410, the body 310 of the device would be spread at slit 380 enough to insert electrical cord 410 such that the cord exits the device at hole 385.

Retainer body 305 also has rear face 350 defining cavity 390 and at least one insulated "U" shaped spring prong 320 rigidly attached and extending from rear face 350. Preferably, each "U" shaped spring prong 320 will have a rigidly fixed leg 322 and a moveable leg 324, with moveable leg 324 defining a barb 340 thereon which protrudes above relief 342 in moveable leg 324. The back of barb 340 has a straight side 343 for holding electrical outlet retainer 300 in socket opening 460 in a manner previously discussed. Barb 340 is biased by spring prong 320 to engage rectangular opening 460 in socket 450, deflecting the moveable leg 324 while an insertion force 403 is applied. The spring force will return moveable leg 324 to its rest position after insertion ensuring that barb 340 engages the back of socket opening 460 in a similar manner to an outlet cover as shown in FIG. 13.

Although the embodiment of the device shown in FIGS. 17-26 utilize the preferred embodiment for locking retained body 305 into socket 450, it is contemplated that all embodiments of locking mechanisms previously discussed herein may also be utilized. Additionally, other locking mechanisms not disclosed herein may also be utilized with departing from the spirit of the invention.

Figure 26:
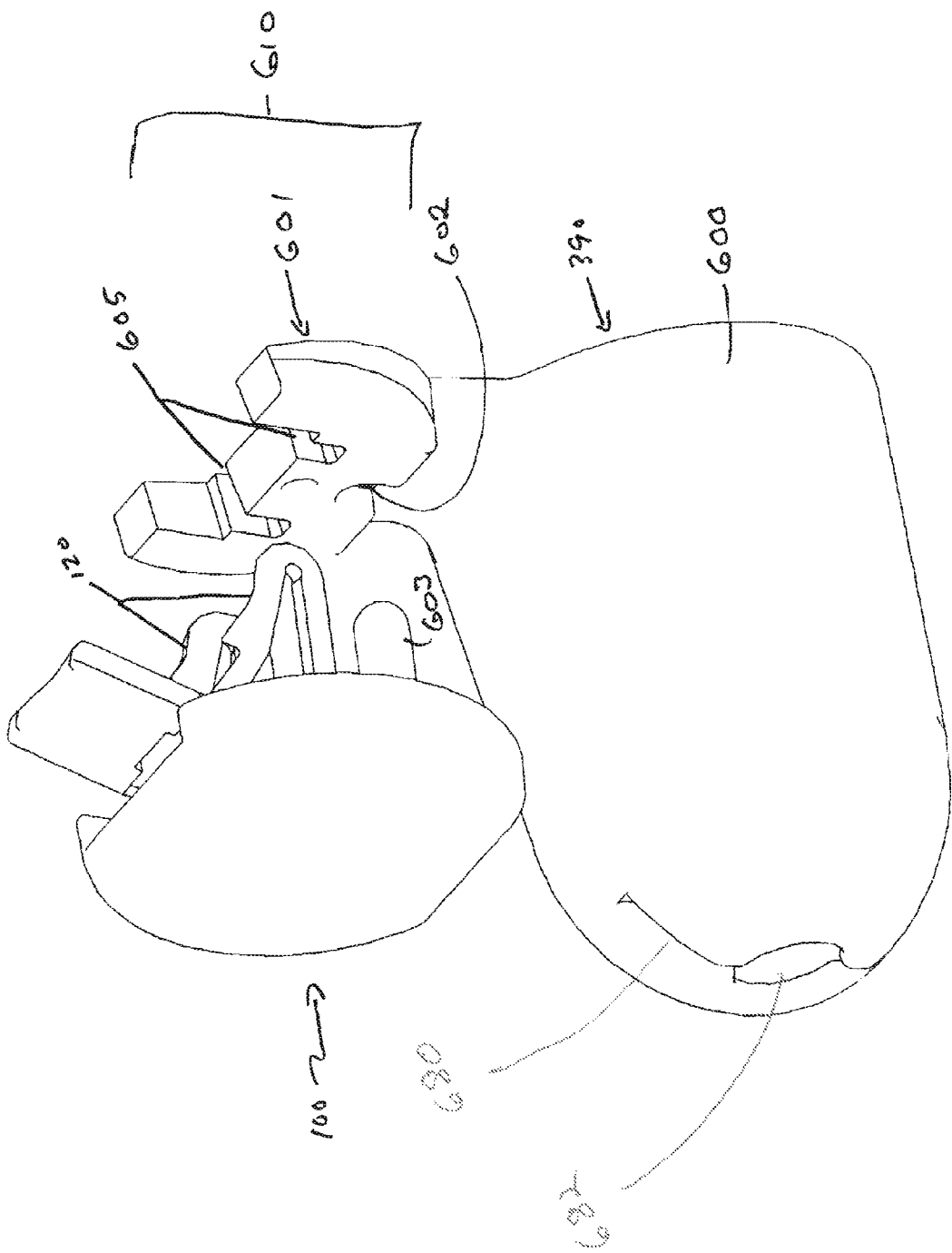
FIG. 26 is a perspective view of a second embodiment of the device of FIGS. 17-25.

In an alternative embodiment of the invention, shown in FIG. 26, a protective outlet cover of any type previously discussed herein may be utilized with a cover for an electrical cord manufactured as a separate piece which is engaged with the protective outlet cover 100 before insertion in to socket 450. FIG. 26 shows the embodiment of outlet cover 100 shown in FIGS. 11-13 being utilized as the locking mechanism for cord cover 600, which defines cavity 390 therein and which is designed to perform the same function as the device shown in FIGS. 17-25, namely retaining electrical cord 410 within cavity 390. Cord cover 600 is provided with engagement portion 610 which will engage protective outlet cover 100 to lock the two portion of the device together. In this embodiment, protective outlet cover 100 is provide with grounding prong 603 which will be inserted into hole 602 defined in cord cover 600. Prongs 120 will engage slots 605 to lock cord cover 600 with protective outlet cover 100.

If is also contemplated that a configuration similar to that shown in FIG. 26 could be used to capture an electrical device within cavity 390.

In another alternate embodiment, electrical device 400 could be a self contained device, such as a nightlight or power pack, as shown in FIGS. 27-30. In this embodiment, the device itself is configured with an engagement portion similar to engagement portion 610 shown in FIG. 26 to lock electrical device 560 with protective outlet cover 510.

Figure 27:
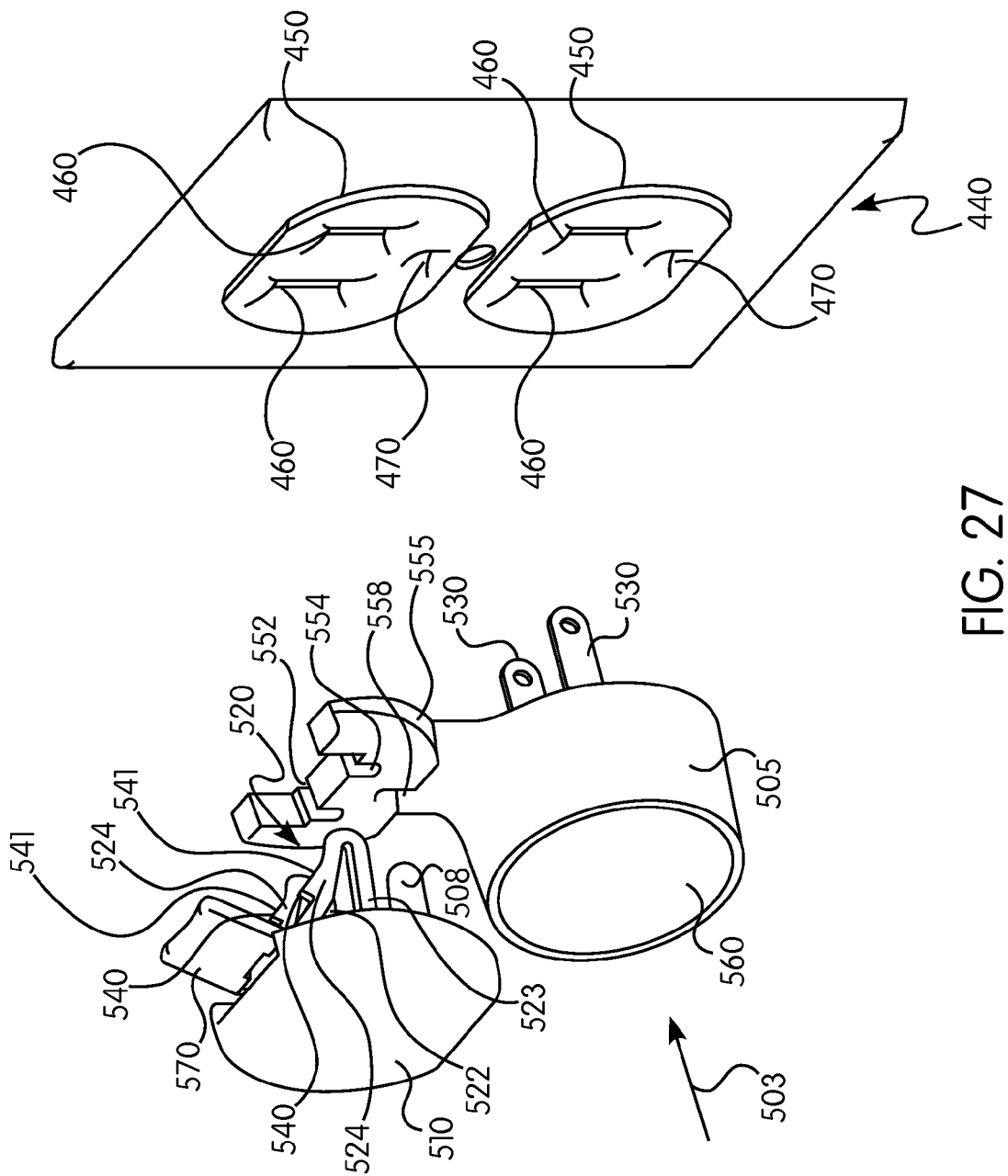
FIG. 27 is an exploded perspective view showing an electrical device retainer of the present invention.
Figure 28:
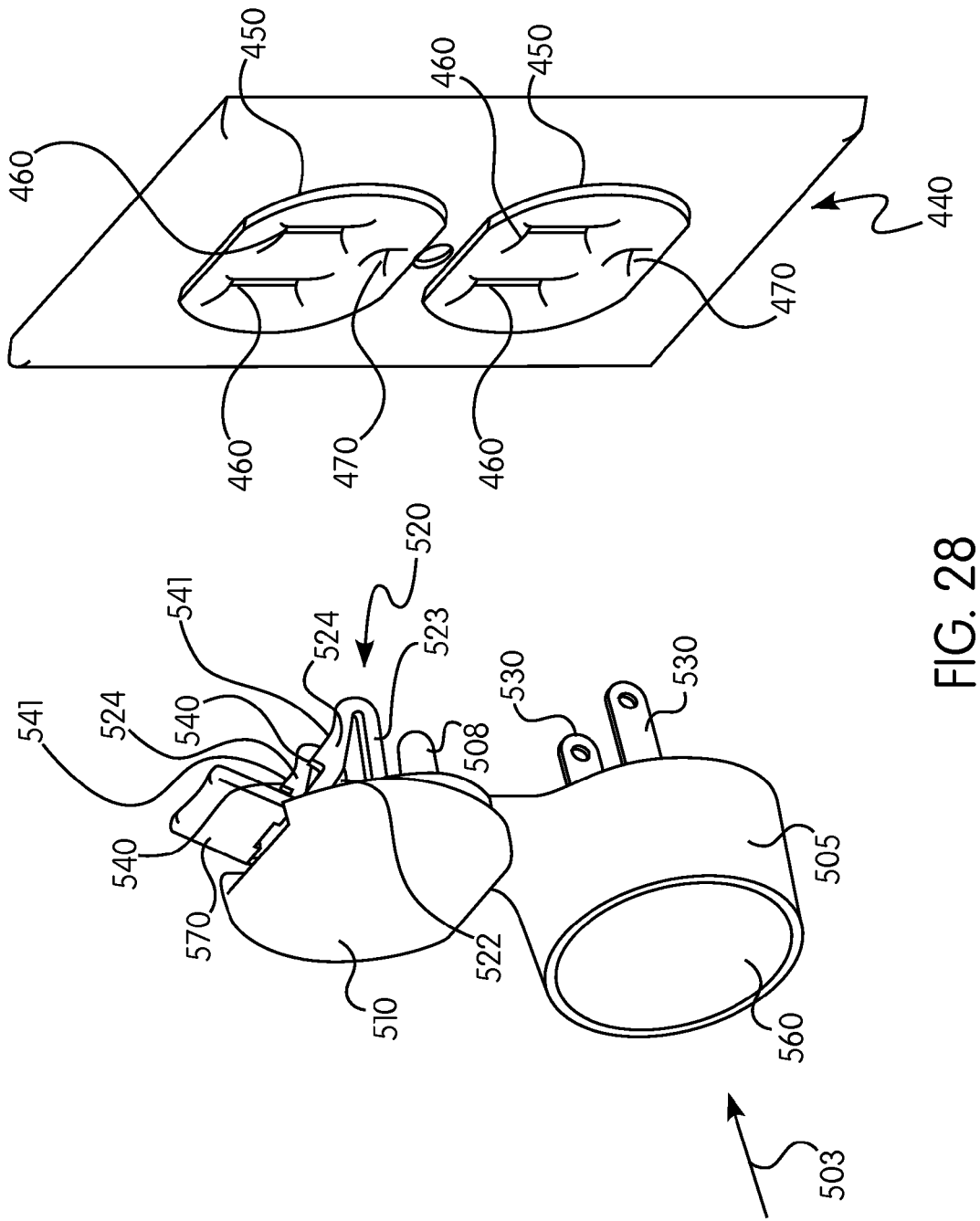
FIG. 28 is a perspective view of an assembled night light electrical device of the present invention being inserted into an electrical outlet.
Figure 29:
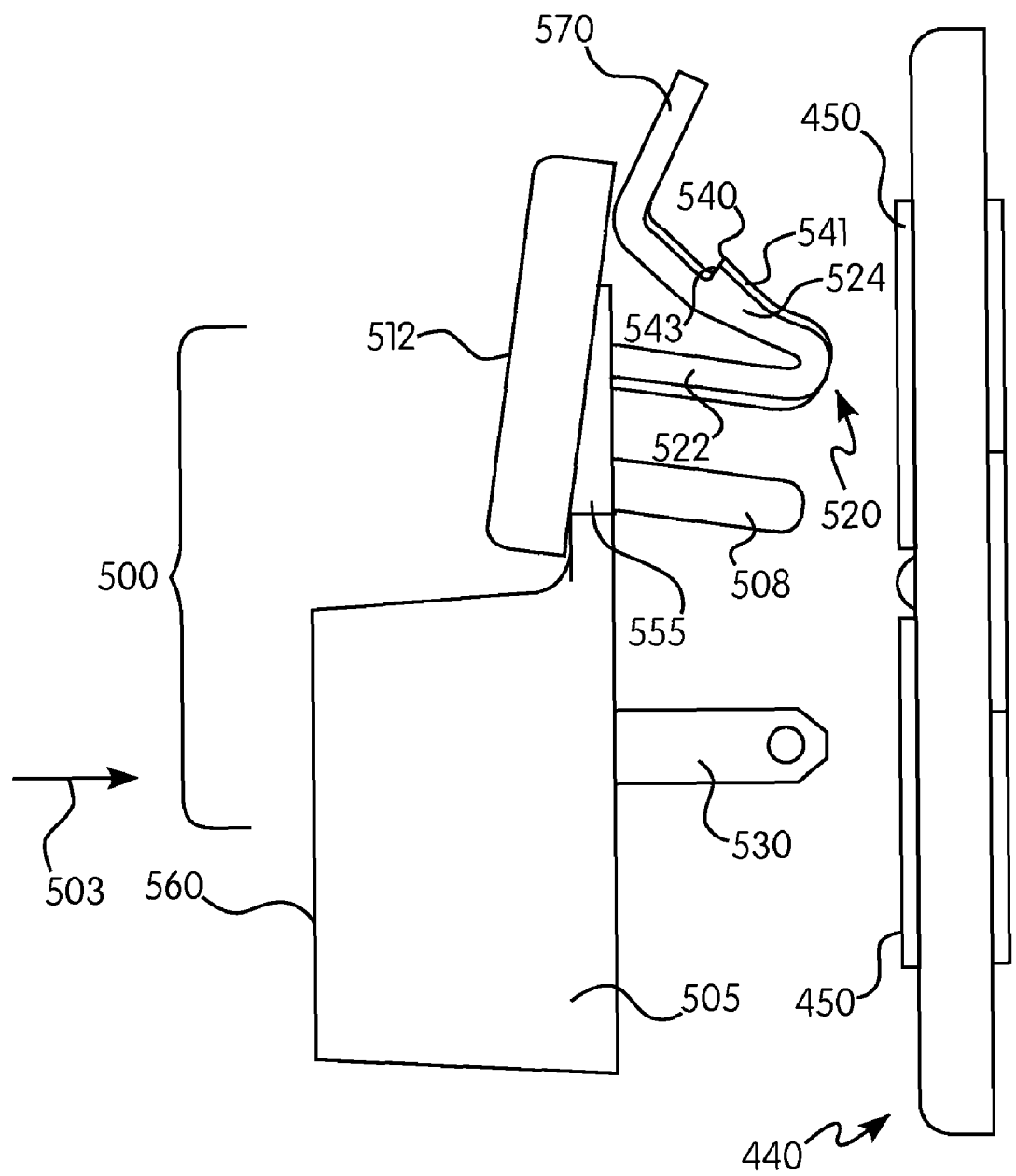
FIG. 29 is a side view of the assembled night light electrical device of the present invention being inserted into an outlet.
Figure 30:
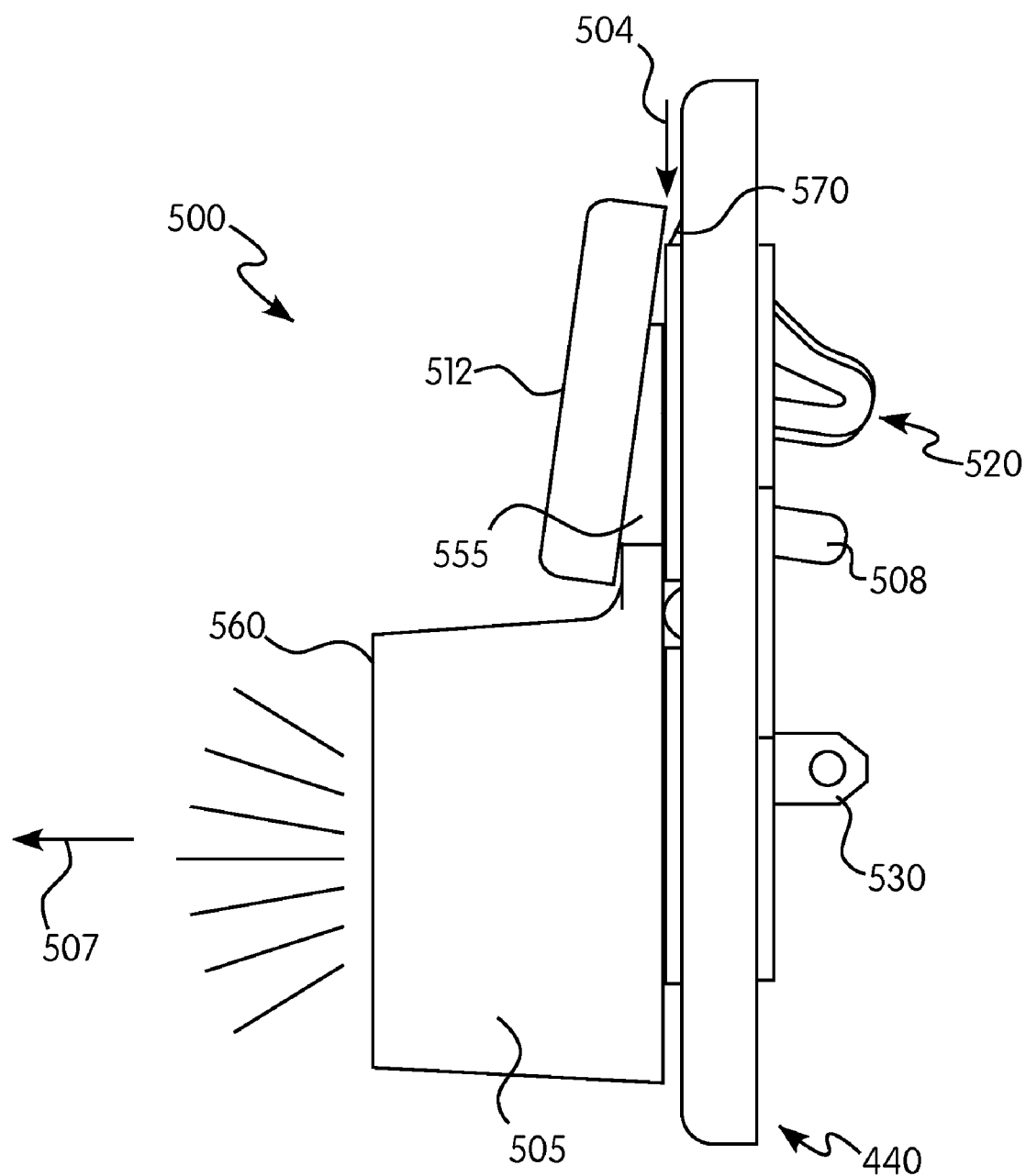
FIG. 30 is a side view of the assembled night light electrical device of the present invention in an electrical outlet.

In FIGS. 28-30, electrical device 500 is embodied as a nightlight and shown as an assembly of a housing member 505 and a retainer cover 510, collectively referred to as a retainer body, for covering a first and second outlet, and having an integrated positive locking mechanism 520. Although embodied as two separate components, retainer cover 510 could be manufactured as an integral component with housing member 505 in a similar manner to the plug retainer devices shown in FIGS. 17-25. Alternatively, the electrical devices and plug retainer devices can also be manufactured as separate parts in a manner similar to the embodiment shown in FIG. 26, which engage each other to form an integrated component, as shown in FIGS. 27-30.

All embodiments shown have at least two spring shaped prongs 520 and a fixed prong 508 wherein the fixed prong is designed to engage the ground opening 470. The moveable legs 524 of the spring prongs 520 are rigidly connected together with a tab 570 such that a force 504 causes the moveable leg 524 to move toward the rigidly fixed leg 522 causing the barb 540 to disengage from the rectangular openings 460 in the socket 450 of the outlet 440 allowing a secondary pulling force 507 to be applied to the outlet plug retainer cover 510 so that it may be removed from the outlet 440.

The cover 510 receives an electrical housing member 505 which acts as a cover for the second socket as shown to be retained in the electrical outlet 440. It is contemplated that the invention could be any type of electrical device with current conducting prongs 530 useful for plugging into and being retained in an outlet 440. In preferred embodiments this electrical device is a nightlight, or an alarm, or a clock. In the case of a preferred nightlight embodiment the housing member 505 has a face plate 560 which is translucent allowing an LED light to shine through. A retainer cover interface 555 is shown as a part of the electrical housing member 505 and ground plug opening 558 and prong openings 552, 554 respectively receive the ground prong 508 and prongs 520 of the retainer cover 510 which may be preassembled as shown in FIG. 27-29 by an adhesive, fasteners, heat staking, ultrasonic welding or any other assembly technique known in the art.

It will be understood that the particular method and device embodying the invention are shown by way of illustration and not as a limitation of the invention. In general, the invention is contemplated to encompass all variations of construction wherein a barbed spring structure defined as part of one or both of the rectangular prongs is utilized to engage the rear of surface of the outlet. Therefore, the principles and features of this invention may be employed in various and numerous embodiments without departing from the scope of the invention. It is understood by those skilled in the art that various changes in form, construction and detail may be made therein without departing from the spirit and scope of the invention, as defined by the appended claims.

I claim:
1. An electrical outlet safety device comprising:
  a. a first body portion having a front face and a rear face;
  b. at least one prong rigidly attached to and extending from said rear face of said body, said at least one prong defining a tongue carrying a barb, said barb being biased by said tongue to engage a first electrical outlet of a pair of electrical outlets when said device is inserted therein;
  c. a second body portion, integral with said first body portion, for covering a second outlet of said pair of electrical outlets, said second body portion defining a cavity for capturing the head of an electrical cord, said second body portion defining a hole to allow passage of the electrical cord;
  wherein said tongue is a generally rectangular-shaped structure having a first end attached to said rear face of said first body portion and a second end spaced distal to said rear face of said first body portion, said tongue being defined by three slits in said rectangular-shaped structure, one of said slits being defined along said first end of said structure and two of said slits being defined near the lateral edges of said structure, said three slits being connected such that said tongue is attached to said structure only at said second end of said structure.

2. The device of claim 1 wherein said tongue is thinner in cross sectional area than the rest of said prong.

3. The device of claim 1 wherein said barb comprises:
  a. one ramped side, said ramped side engaging said first outlet as said device is inserted into said first outlet, thus deflecting said tongue such that said barb fits through a rectangular slit in said first outlet; and
  b. one straight side, said straight side engaging said first outlet when said device is fully inserted into said first outlet, thus preventing the removal of said device from said first outlet.

4. The device of claim 1 further comprising one or more openings, defined in said first body portion, through which an object may be inserted to deflect said tongue, such that said barb is disengaged from said first outlet, thus enabling the removal of said device from said first outlet.

5. The device of claim 4 wherein said object is a disengagement member attached to said tongue and extending through or accessible from one of said openings, such that applying a lateral force to said disengagement member causes said tongue to deflect such that said barb is disengaged from said first outlet.

6. The device of claim 1 comprising at least two prongs rigidly attached to said rear face of said first body portion, at least one of which defines said tongue and barb therein.

7. An electrical outlet safety device comprising:
 a. a first body portion having a front face and a rear face;
 b. at least one prong rigidly attached to and extending from said rear face of said body, said at least one prong defining a tongue carrying a barb, said barb being biased by said tongue to engage a first electrical outlet of a pair of electrical outlets when said device is inserted therein:
 c. a second body portion, integral with said first body portion, for covering a second outlet of said pair of electrical outlets, said second body portion defining a cavity for capturing the head of an electrical cord, said second body portion defining a hole to allow passage of the electrical cord;
 wherein said tongue is a generally rectangular-shaped structure, attached at a first end to said rear face of said first body portion and a second end spaced distal to said rear face of said first body portion; said tongue being defined by two slits in said structure, said slits being defined near the lateral edges of said structure, such that said tongue is attached to said structure only at said first end of said structure and said second end of said structure.

8. The device of claim 7 wherein said tongue is thinner in cross sectional area than the rest of said prong.

9. The device of claim 7 wherein said barb comprises two ramped sides, one of said ramped sides engaging said first outlet as said device is inserted into said first outlet, and the other of said ramped sides engaging said first outlet as said device is extracted from said first outlet, said ramped surfaces causing said tongue to deflect such that said barb fits through a rectangular opening in said first outlet.

10. The device of claim 9 comprising at least two prongs rigidly attached to said rear face of said first body portion, at least one of which defines said tongue and barb therein.

11. An electrical outlet safety device comprising:
 a. a first body portion having a front face and a rear face;
 b. at least one prong rigidly attached to and extending from said rear face of said body, said at least one prong defining a tongue carrying a barb, said barb being biased by said tongue to engage a first electrical outlet of a pair of electrical outlets when said device is inserted therein:
 c. a second body portion, integral with said first body portion, for covering a second outlet of said pair of electrical outlets, said second body portion defining a cavity for capturing the head of an electrical cord, said second body portion defining a hole to allow passage of the electrical cord;
 wherein said at least one prong further comprises a generally "U" shaped structure, having one leg of said "U" being rigidly attached to said rear face of said first body portion, and the other leg being moveable with respect to said rigidly fixed leg.

12. The device of claim 11 further comprising a first barb, defined on said moveable leg of said "U" shaped prong, said first barb comprising:
 a. one ramped side, said ramped side engaging an outer surface of said first outlet as said device is inserted into said first outlet, thus deflecting said moveable leg such that said barb fits through a rectangular slit in said first outlet; and
 b. one straight side, said straight side engaging said first outlet when said device is fully inserted into said first outlet, thus preventing the removal of said device from said first outlet.

13. The device of claim 12 further comprising a first tab, rigidly connected to said moveable leg, said tab extending outwardly from said first body portion, such that a force applied to said first tab will cause said moveable leg to move toward said rigidly fixed leg, causing said barb to disengage from said first outlet, thus enabling the removal of said device from said first outlet.

14. The device of claim 13 wherein the other of said prongs is "U"shaped, having one leg of said "U" being rigidly attached to said rear face of said first body portion, and the other leg being moveable with respect to said rigidly fixed leg, further comprising:
 a second barb, defined on said moveable leg of said other prong;
 a second tab, rigidly connected to said moveable leg of said other prong; and
 a connecting member disposed between and rigidly connected to said first and second tabs, such that a force applied to said connecting member will cause said both of said moveable legs to move simultaneously toward said rigidly fixed legs, causing said barbs to disengage from said first outlet.

15. A device for preventing the removal of an electrical cord from an electrical outlet designed to be used with a locking mechanism having a body and at least one prong rigidly attached to and extending from a rear face of said body, said at least one prong defining a tongue carrying a barb, said barb being biased by said tongue to engage a first outlet of a pair of electrical outlets when said locking mechanism is inserted therein, said device comprising:
 a. a second body portion for covering a second outlet of a pair of electrical outlets, said second body portion defining a cavity for capturing the head of an electrical cord plugged into said second outlet, said second body portion defining a hole to allow passage of said electrical cord; and
 b. an engagement portion, integral with said second body portion, said engagement portion defining one or more partial or whole slits for accepting the prongs of said locking mechanism.

16. The device of claim 15 wherein said locking mechanism further defines a grounding pin extending from said rear face of said body, said device further defining a hole in said engagement portion for accepting said grounding pin of said locking mechanism.

17. The device of claim 16 wherein said second body portion further defines a slit therein, said slit bisecting said second body portion and said hole, allowing two halves of said second body portion defined by said slit to be spread apart such that said electrical cord can be positioned in said hole.

18. A self-contained electrical device capable of being locked into an electrical outlet by a locking mechanism having a body and at least one prong rigidly attached to and extending from a rear face of said body, said at least one prong defining a tongue carrying a barb, said barb being biased by said tongue to engage a first outlet of a pair of electrical outlets when said locking mechanism is inserted therein, said device comprising:
 a. a second body portion for containing said electrical device, said electrical device having two electrically conductive prongs for insertion into a second outlet of a pair of electrical outlets; and
 b. an engagement portion, integral with said second body portion, said engagement portion defining one or more partial or whole slits for accepting the prongs of said locking mechanism.

19. The device of claim 18 wherein said locking mechanism further defines a grounding pin extending from said rear face of said body, said device further defining a hole in said engagement portion for accepting said grounding pin of said locking mechanism.

20. The device of claim 18 wherein said electrical device is a light.

* * * * *